(12) United States Patent
Vancea

(10) Patent No.: US 7,466,049 B1
(45) Date of Patent: Dec. 16, 2008

(54) WHEEL ASSEMBLY WITH ELECTRIC POWER GENERATOR

(76) Inventor: Peter Vancea, 2516 W. Barbie La., Phoenix, AZ (US) 85085

( * ) Notice: Subject to any disclaimer, the term of this patent is extended or adjusted under 35 U.S.C. 154(b) by 88 days.

(21) Appl. No.: 11/754,192

(22) Filed: May 25, 2007

(51) Int. Cl.
  *H02K 7/10* (2006.01)
(52) U.S. Cl. .................. 310/75 C; 310/198; 310/268; 180/65.1
(58) Field of Classification Search ............. 310/75 C, 310/198, 184, 156.32, 156.37, 268, 113; 180/65.1
  See application file for complete search history.

(56) References Cited

U.S. PATENT DOCUMENTS

| | | | |
|---|---|---|---|
| 4,223,255 A | | 9/1980 | Goldman et al. |
| 4,475,075 A | | 10/1984 | Munn |
| 4,761,577 A | | 8/1988 | Thomas et al. |
| 5,334,898 A | * | 8/1994 | Skybyk ............... 310/268 |
| 5,440,185 A | * | 8/1995 | Allwine, Jr. ........... 310/156.37 |
| 5,775,229 A | | 7/1998 | Folk et al. |
| 5,909,094 A | * | 6/1999 | Yamada et al. ............ 318/140 |
| 6,046,518 A | * | 4/2000 | Williams .................. 310/43 |
| 6,129,185 A | * | 10/2000 | Osterberg et al. ........ 188/267.2 |
| 6,742,386 B1 | | 6/2004 | Larson |
| 6,765,324 B1 | | 7/2004 | Chien |
| 6,932,367 B2 | * | 8/2005 | Radamis ............. 280/124.158 |
| 7,001,053 B1 | | 2/2006 | Chieh et al. |
| 7,121,631 B2 | | 10/2006 | Strzelczyk |
| 7,365,472 B2 | * | 4/2008 | Hiramatsu ................. 310/263 |
| 2001/0008191 A1 | | 7/2001 | Smith et al. |
| 2003/0000615 A1 | | 1/2003 | Volpi |
| 2006/0164225 A1 | | 7/2006 | Pearman |
| 2008/0024035 A1 | * | 1/2008 | Aydin et al. .............. 310/268 |

* cited by examiner

*Primary Examiner*—Michael C Zarroli
(74) *Attorney, Agent, or Firm*—Parsons & Goltry; Michael W. Goltry; Robert A. Parsons

(57) ABSTRACT

A wheel assembly includes a carrier and a wheel mounted adjacent to the carrier for rotation relative to the carrier. A first array of magnets is carried by one of the first side of the wheel and the carrier, and a first array of coils is carried by the other of the wheel and the carrier corresponding to the first array of magnets. A spinner is mounted adjacent to the wheel for rotation relative to the wheel. A second array of magnets is carried by one of the wheel and the carrier, and a second array of coils is carried by the other of the wheel and the spinner corresponding to the second array of magnets.

11 Claims, 11 Drawing Sheets ically perpendicular to the second circumferential arrays of magnets, and the second array of coils includes second circumferential arrays of coils spaced from, opposing, substantially parallel to and corresponding with the second circumferential arrays of magnets, and second annular arrays of coils spaced from, opposing, substantially parallel to and corresponding with the second annular arrays of magnets.

WHEEL ASSEMBLY WITH ELECTRIC POWER GENERATOR

FIELD OF THE INVENTION

The present invention relates to electric power generators and to wheel assemblies incorporating electric power generators.

BACKGROUND OF THE INVENTION

Future energy development faces great challenges due to an increasing world population, demands for higher standards of living, a need for less pollution, a need to avert global warming, and a need for less reliance on fossil fuels. Because reliance on traditional sources of energy and energy generation relies in large part on unrenewable fossil fuels, and because it is believed that reliance on fossil fuels cannot adequately meet future energy needs, the need for reliance on renewable energy sources and the development of renewable energy sources are vitally important to ensure future energy needs can be satisfied.

Most automobiles in use today are propelled by gasoline or diesel internal combustion engines, which are known to cause air pollution and contribute to climate change and global warming. Increasing costs of oil-based fuels and increasingly rigorous environmental laws and restrictions on greenhouse gas emissions are influencing efforts toward development of alternative power systems for automobiles including hybrid vehicles, hydrogen vehicles, and electric power vehicles.

Hybrid vehicles most commonly incorporate internal combustion engines and electric batteries to power electric motors. Hydrogen vehicles utilize hydrogen as the primary source of power for locomotion. Hydrogen vehicles generally use hydrogen through combustion or fuel cell conversion. In combustion, the hydrogen is essentially burned in engines in fundamentally the same way as traditional gasoline engines. In fuel-cell conversion, the hydrogen is reacted with oxygen to produce water and electricity used to power electric motors.

The first electric vehicles were built in the late 1800s. However, the building of battery-powered vehicles that could rival internal combustion models came about only through the advent of modern semiconductor controls. Because electric vehicles can deliver high torque at lower revolutions, electric vehicles do not require the complex drive trains and transmissions required by vehicles powered by internal combustion engines.

Regardless of the type of alternative power system employed for automobiles, most utilize batteries to provide either backup or primary power for driving electric motors for providing either a secondary or a primary means of facilitating propulsion. As a result, in alternative vehicles that utilize batteries for providing electrical power to drive electric motors, the batteries must be periodically recharged. However, recharging requirements normally result in long periods of down or recharging time. Although numerous efforts have been made toward the development of onboard electric power generators that operate to generate electrical power to recharge onboard batteries during operation, existing onboard electric power generators are expensive, complicated to build, and inefficient. These and other shortcomings must be overcome if a viable alternative to conventional internal combustion engines can be successfully implemented.

SUMMARY OF THE INVENTION

According to the invention, a wheel assembly includes a carrier, and a wheel mounted adjacent to the carrier for rotation relative to the carrier. The wheel has a first side facing the carrier and an opposed second side. A first array of magnets is carried by one of the first side of the wheel and the carrier, and a first array of coils is carried by the other of the first side of the wheel and the carrier corresponding to the first array of magnets, the first array of coils spaced from and aligned with the first array of magnets. A spinner is mounted adjacent to the second side of the wheel for rotation relative to the wheel. A second array of magnets is carried by one of the second face of the wheel and the carrier, and a second array of coils is carried by the other of the second face of the wheel and the spinner corresponding to the second array of magnets, the second array of coils spaced from and aligned with the second array of magnets. An aerofoil is supported by the spinner and is adapted to interact with an air stream passing relative to the wheel in response to a rolling of the wheel relative to a surface in a first rotational direction for setting the spinner in rotational motion in a second rotational direction opposite to the first rotational direction. The aerofoil is mounted to the spinner for movement between a retracted position relative to the spinner and a deployed position relative to the spinner in response to application of the air stream to the aerofoil. A winglet is attached to the aerofoil for initially interacting with the air stream for initially drawing the aerofoil out of the retracted position toward the deployed position. A compartment is formed between the spinner and the wheel, an opening is formed through the spinner leading to the compartment, the aerofoil is mounted to the spinner proximate to the opening, and the aerofoil is at least partially received in the compartment through the opening in the retracted position of the aerofoil. A bias imparted to the aerofoil biases the aerofoil into the retracted position. In one embodiment a spring interacting between the spinner and the aerofoil imparts to the aerofoil the bias biasing the aerofoil into the retracted position. In another embodiment, the aerofoil is formed of a resilient material imparting the bias to the aerofoil biasing the aerofoil into the retracted position. First electrical wiring is coupled to the first array of coils for receiving and carrying electromagnetic energy from the first array of coils, and second electrical wiring is coupled to the second array of coils for receiving and carrying electromagnetic energy from the second array of coils. The first array of magnets includes first circumferential arrays of magnets and first annular arrays of magnets substantially perpendicular to the first circumferential arrays of magnets, and the first array of coils includes first circumferential arrays of coils spaced from, opposing, substantially parallel to and corresponding with the first circumferential arrays of magnets, and first annular arrays of coils spaced from, opposing, substantially parallel to and corresponding with the first annular arrays of magnets. The second array of magnets includes second circumferential arrays of magnets and second annular arrays of magnets substantially perpendicular to the second circumferential arrays of magnets, and the second array of coils includes second circumferential arrays of coils spaced from, opposing, substantially parallel to and corresponding with the second circumferential arrays of magnets, and second annular arrays of coils spaced from, opposing, substantially parallel to and corresponding with the second annular arrays of magnets.

According to the principle of the invention, a wheel assembly includes a wheel mounted for rotation, a spinner mounted adjacent to the wheel for rotation relative to the wheel with a rotary electrical connector, a first array of magnets carried by the wheel, and a first array of coils carried by the spinner corresponding to the second array of magnets, the second array of coils spaced from and aligned with the second array of magnets and electrically coupled to the rotary electrical connector. An aerofoil is supported by the spinner and is adapted to interact with an air stream passing relative to the wheel in response to a rolling of the wheel relative to a surface in a first rotational direction for setting the spinner in rotational motion in a second rotational direction opposite to the first rotational direction. The aerofoil is mounted to the spinner for movement between a retracted position relative to the spinner and a deployed position relative to the spinner in response to application of the air stream to the aerofoil. A winglet is attached to the aerofoil for initially interacting with the air stream for initially drawing the aerofoil out of the retracted position toward the deployed position. A compartment is formed between the spinner and the wheel, an opening is formed through the spinner leading to the compartment, the aerofoil is mounted to the spinner proximate to the opening, and the aerofoil is at least partially received in the compartment through the opening in the retracted position of the aerofoil. A bias is imparted to the aerofoil biasing the aerofoil into the retracted position. In one embodiment a spring interacting between the spinner and the aerofoil imparts to the aerofoil the bias biasing the aerofoil into the retracted position. In another embodiment the aerofoil is formed of a resilient material imparting the bias to the aerofoil biasing the aerofoil into the retracted position. In a further aspect, a carrier is mounted adjacent to the wheel, a second array of magnets is carried by one of the wheel and the carrier, and a second array of coils is carried by the wheel and the carrier corresponding to the second array of magnets, the second array of coils spaced from and aligned with the second array of magnets. Electrical wiring is coupled to the rotary electrical connector for receiving and carrying electromagnetic energy supplied to the rotary electrical connector from the first array of coils, and electrical wiring is coupled to the second array of coils for receiving and carrying electromagnetic energy from the second array of coils. The first array of magnets includes first circumferential arrays of magnets and first annular arrays of magnets substantially perpendicular to the first circumferential arrays of magnets, and the first array of coils includes first circumferential arrays of coils spaced from, opposing, substantially parallel to and corresponding with the first circumferential arrays of magnets, and first annular arrays of coils spaced from, opposing, substantially parallel to and corresponding with the first annular arrays of magnets. The second array of magnets includes second circumferential arrays of magnets and second annular arrays of magnets substantially perpendicular to the second circumferential arrays of magnets, and the second array of coils includes second circumferential arrays of coils spaced from, opposing, substantially parallel to and corresponding with the second circumferential arrays of magnets, and second annular arrays of coils spaced from, opposing, substantially parallel to and corresponding with the second annular arrays of magnets.

According to the principle of the invention, a wheel assembly includes a carrier mounted between opposed first and second wheels mounted for rotation relative to the carrier, first and second arrays of magnets carried by the first and second wheels, respectively, and an array of coils carried by the carrier spaced from and aligned with the first array of magnets and the second array of magnets. Electrical wiring is coupled to the array of coils for receiving and carrying electromagnetic energy from the array of coils. In a particular embodiment, the carrier is mounted for rotation, and is operatively coupled to the opposed first and second wheels, whereby rotation of the opposed first and second wheels in a first rotational direction imparts rotation to the carrier in a second rotational direction opposite to the first rotational direction. Preferably, the carrier is operative coupled to the opposed first and second wheels with a roller bearing. In a particular embodiment, the first and second wheels are mounted to a vehicle, having a vehicle frame, for rotation, and a damper is coupled between the vehicle frame and the carrier permitting the carrier to displace relative to the vehicle frame.

According to the principle of the invention, a wheel assembly includes a carrier mounted for rotation adjacent to a wheel mounted for rotation, an array of magnets carried by one of the wheel and the carrier, an array of coils carried by the other of the carrier and the wheel, and the carrier operatively coupled to the wheel, whereby rotation of the wheel in a first rotational direction imparts rotation to the carrier in a second rotational direction opposite to the first rotational direction. Preferably, the carrier is operative coupled to the wheel with a roller bearing. Electrical wiring is coupled to the array of coils for receiving and carrying electromagnetic energy from the array of coils. In a particular embodiment, the wheel is mounted to a vehicle, having a vehicle frame, for rotation, and a damper is coupled between the vehicle frame and the carrier permitting the carrier to displace relative to the vehicle frame.

Consistent with the foregoing summary of preferred embodiments, and the ensuing detailed description, which are to be taken together, the invention also contemplates associated embodiments.

BRIEF DESCRIPTION OF THE DRAWINGS

Referring to the drawings.

DETAILED DESCRIPTION OF PREFERRED EMBODIMENTS

Figure 1:
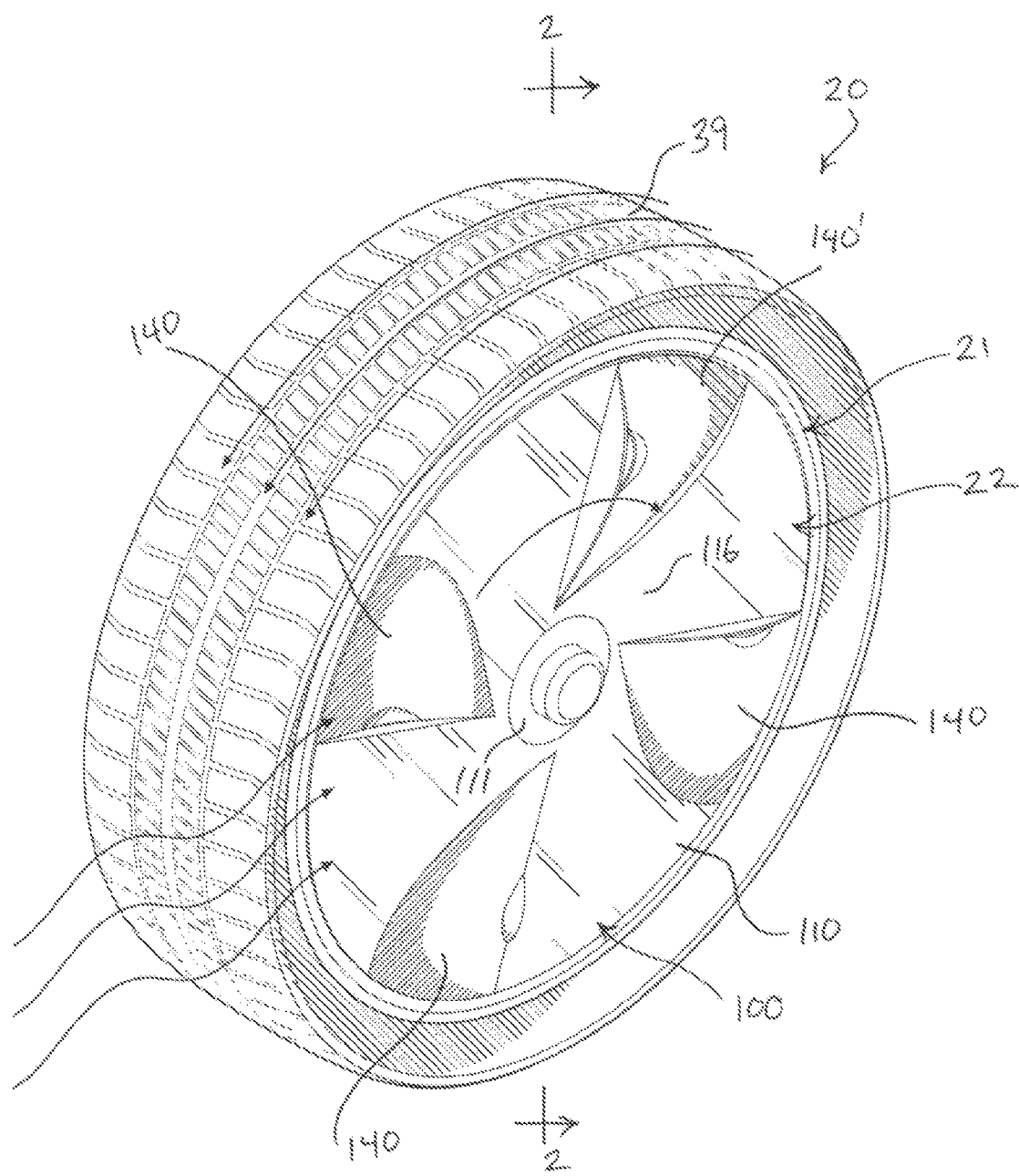
FIG. 1 is a perspective view of a wheel assembly incorporating an electric power generator constructed and arranged in accordance with the principle of the invention.

Turning now to the drawings, in which like reference characters indicate corresponding elements throughout the several views, attention is first directed to FIG. 1 in which there is seen a wheel assembly constructed and arrange in accordance with the principle of the invention and generally designed by the reference character 20. Wheel assembly 20 consists of a wheel 21 incorporating an electrical power generator 22 that generates electrical power in response to rotation of wheel 21, in accordance with the principle of the invention.

Figure 2:
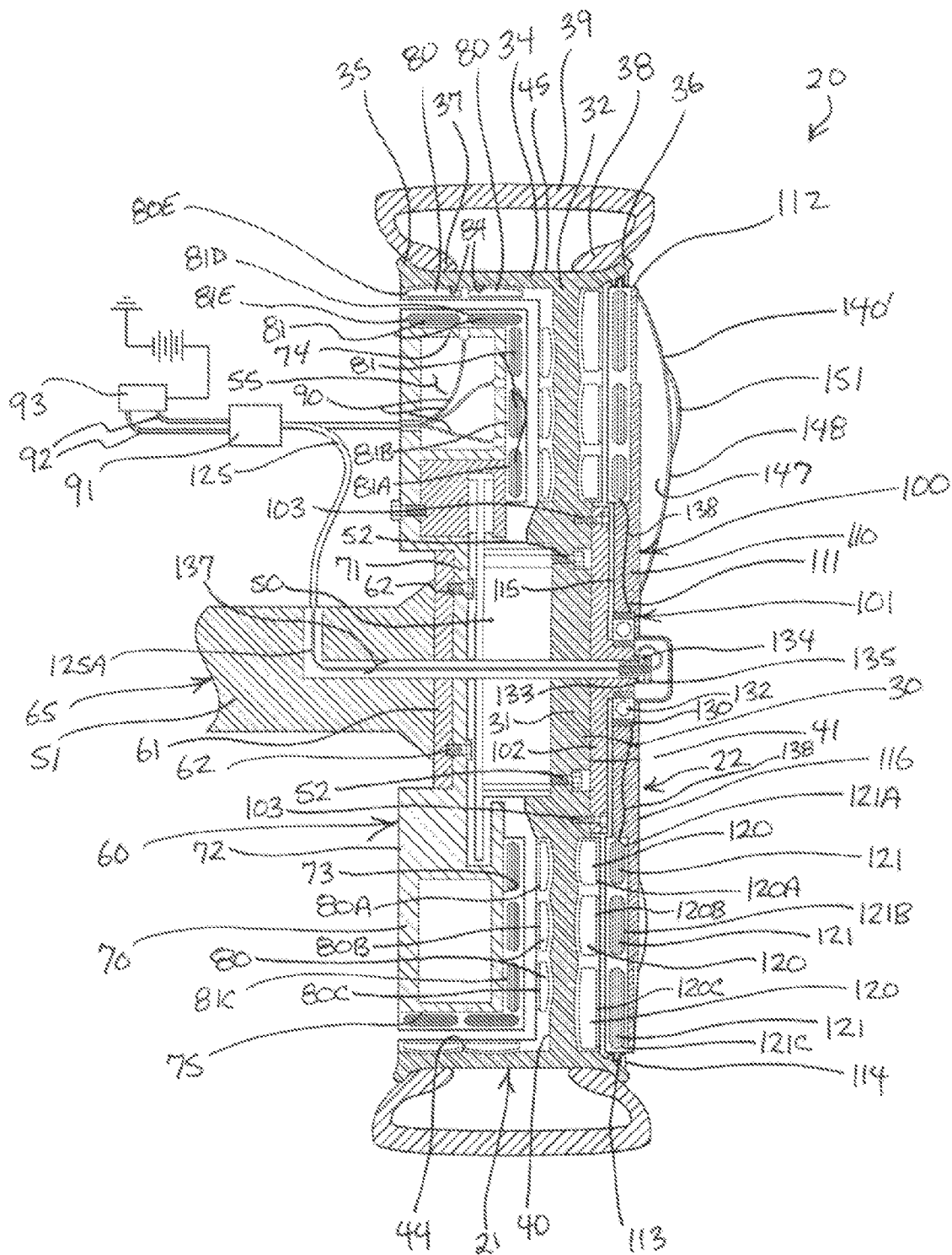
FIG. 2 is a sectional view taken along line 2-2 of FIG. 1.

Referencing FIG. 2, which is a sectional view taken along line 2-2 of FIG. 1, wheel 21 consists of an upright circular frame 30 including a central hub 31 and a circular outer perimeter edge 32. An annular sidewall 34 is affixed to outer perimeter edge 32, and is substantially perpendicular relative to circular frame 30. Annular sidewall 34 is formed with opposed annular rims 35 and 36 that accept beads 37 and 38, respectively, of a conventional tire 39. Outer perimeter edge 32 is attached to annular sidewall 34 between opposed annular rims 35 and 36, in this embodiment being closer to annular rim 36. Circular frame 30 has an inner face 40, and an opposed outer face 41. Annular sidewall 34 has an annular inner face 44 facing inwardly toward circular frame 30, and an opposed annular outer face 45, which is the tire-facing side of annular sidewall 34. Annular inner face 44 is perpendicular relative to inner face 40 and outer face 41. For reference purposes, inner face 40 of circular frame 30 and annular inner face 44 of annular sidewall 34 extending inwardly relative to inner face 40 of circular frame 30 cooperate to forming the inner side of wheel 21, and outer face 41 of circular frame 30 forms the outer side of wheel 21. Hub 31 is mounted to a rotor 50, that is, in turn, mounted to an axle 51 of a vehicle for rotation in a conventional and well-known manner. Hub 31 is mounted to rotor 50 with threaded fasteners 52 in a conventional and well-known manner. A receiving area, well, or cavity 55 is defined by the inner side of wheel 21, namely, inner face 40 of circular frame 30 and annular inner face 44 of annular sidewall 34 extending inwardly relative to inner face 40 of circular frame 30. Wheel 21 is generally representative of a car wheel.

According to the principle of the invention, electric power generator 22 of wheel assembly 20 incorporates a carrier 60 affixed to vehicle frame 61 of vehicle 65, in this embodiment with threaded fasteners 62 although rivets, nut-and-bolt assemblies or the like may be used, if desired. Carrier 60 encircles axle 51 adjacent to rotor 50. Carrier 60 is a non-moving part constituting a stator, whereby wheel 21 rotates relative to carrier 60. Carrier 60 is fashioned of steel, aluminum, fiberglass, carbon fiber, plastic, or other rigid or substantially rigid material or combination of materials, and is received in, and generally relates to, cavity 55.

Carrier 60 consists of generally circular body 70 including a hub 71, which is secured to vehicle frame 61 of vehicle 65 with threaded fasteners 62, an inner face 72, an opposed outer face 73, and an annular outer perimeter sidewall 74 defining an annular outer face 75 substantially parallel to and spaced from annular inner face 44 of annular sidewall 34, and which is perpendicular relative to inner face 72 and outer face 73. Although carrier 60 is attached to vehicle frame 61 at hub 71, carrier 60 may, if desired, be secured to vehicle frame 61 at other locations as may be selected. Inner face 72 faces inwardly toward axle 51, and outer face 73 faces inner face 40 of circular frame 30 of wheel 21. Outer face 73 of carrier 60 is substantially parallel to and spaced from inner face 40 of circular frame 30 of wheel 21. Inner face 72 forms the inner side of carrier 60, and outer face 73 and annular outer face 75 cooperating forming what is considered the outer side of carrier 60 according to this disclosure.

Figure 3:
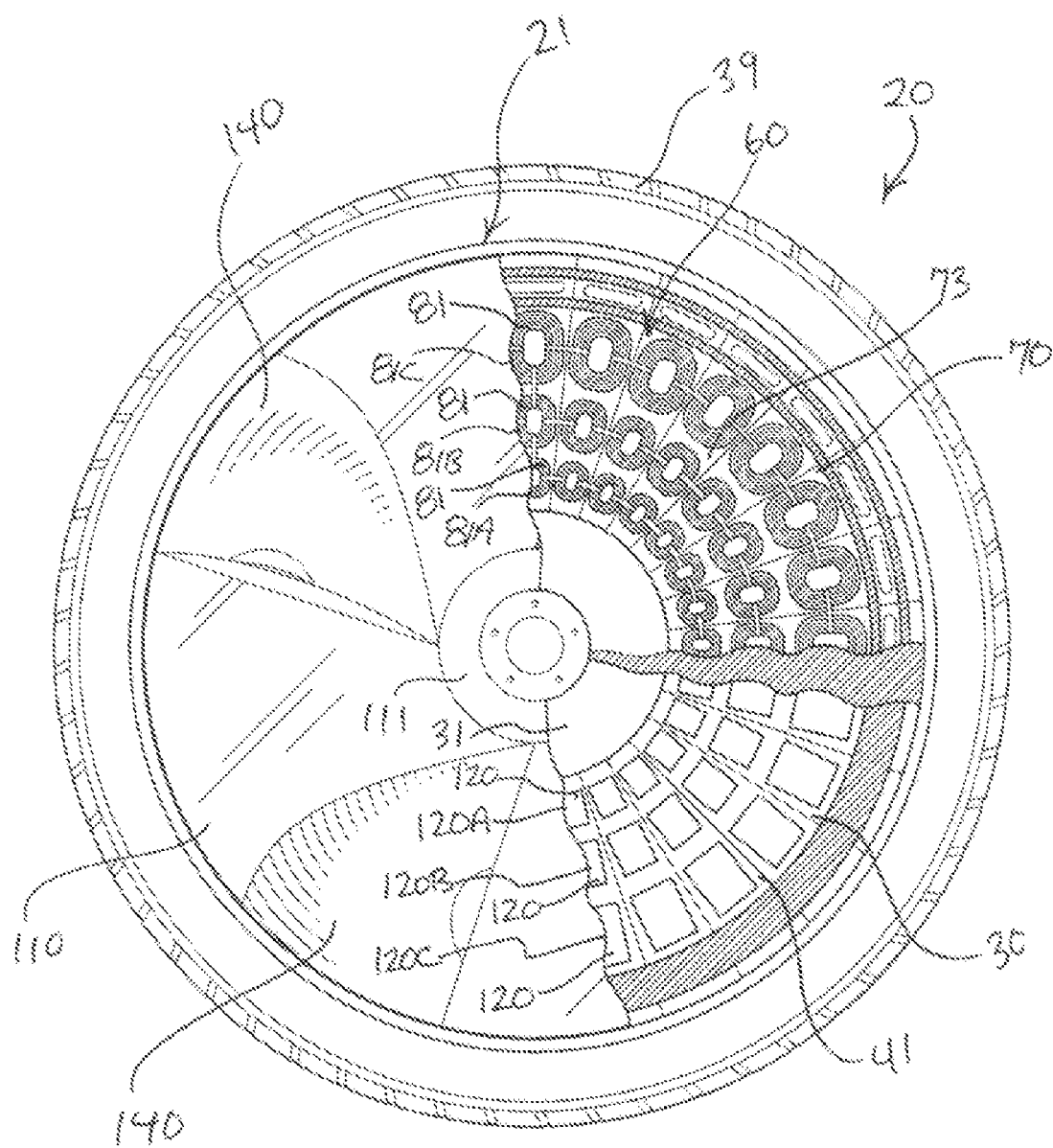
FIG. 3 is a front elevational view of the wheel assembly of FIG. 1 with portions thereof broken away illustrating an array of batteries mounted to a wheel of the wheel assembly and an array of coils mounted to a carrier forming part of the wheel assembly.
Figure 4:
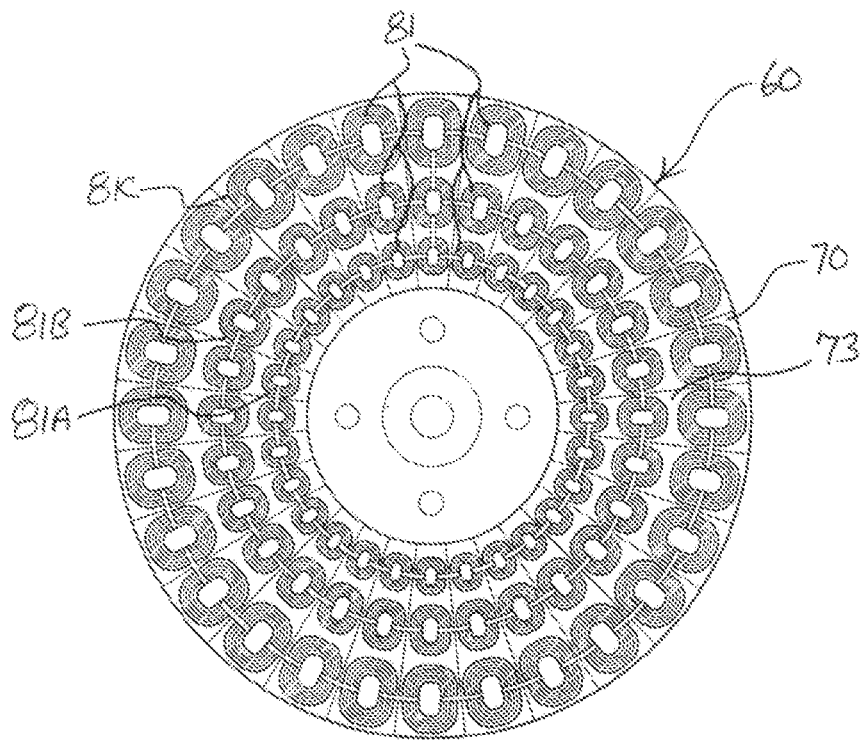
FIG. 4 is a front elevational view of a carrier of the wheel assembly of FIG. 1 shown as it would appear incorporating an array of coils.

The inner side of wheel 21 carries an array of magnets 80, and the outer side of carrier 60 carries a corresponding array of coils 81. In the present embodiment, the array of magnets 80 formed on the inner side of wheel 21 includes an array of magnets 80 formed on inner face 40 of circular frame 30 and an array of magnets 80 formed on annular inner face 44 of annular sidewall 34 generally perpendicular to the array of magnets 80 formed on inner face 40 of circular frame 30, and the array of coils 81 formed on the outer side of carrier 60 includes an array of coils 81 formed on outer face 73 of body 70 and an array of coils 81 formed in annular outer face 75 of body 70 generally perpendicular to the array of coils 81 formed in outer face 73. The array of magnets 80 formed on inner face 40 of circular frame 30 consists of circumferential arrays 80A, 80B, and 80C of magnets 80 encircling hub 31, and the array of magnets 80 formed on annular inner face 44 of annular sidewall 45 consists of circumferential annular arrays 80D and 80E of magnets 80. The array of coils 81 formed on outer face 73 of body 70 consist of circumferential arrays 81A, 81B, and 81C of coils 81 encircling hub 71, and the array of coils 81 formed on annular outer face 75 of body 70 consists of circumferential annular arrays 81D and 81E of coils 81. Arrays 80A, 80B, and 80C of magnets 80 are spaced from, oppose, are substantially parallel to and correspond with arrays 81A, 81B, and 81C of coils 81, and arrays 80D and 80E of magnets are spaced from, oppose, are substantially parallel to and correspond with arrays 81D and 81E of coils 81. As a matter of illustration and reference, FIG. 3 is a front elevational view of wheel assembly 20 with portions thereof broken away illustrating a portion of circumferential arrays 81A, 81B, and 81C of coils 81. FIG. 4 is a front elevational view of carrier showing circumferential arrays 81A, 81B, and 81C of coils 81.

Magnets 80 are entirely conventional, and are each mounted in a corresponding recess or pocket 84 formed in wheel 21. Magnets 80 are fixedly mounted to wheel 21 with screws or other suitable fastener, and may, if desired, be applied to wheel 21 and then encased in a protective casing, such as a resin protective casing or other form of protective casing. Coils 81 each comprise a selected number of turns of conductive wire, preferably insulated conductive wire, whereby all coils 81 are wound in the same direction and are wired together thereby being electrically connected.

In response to rotation of wheel 21 relative to carrier 60, such as in response to a driving of vehicle 65 in the normal manner causing wheel 21 to rotate relative to the road or other surface over which the vehicle is driven, magnets 80 rotate relative to carrier 60 and coils 81 whereby the magnetic energy imparted by magnets 80 energizes coils 81 with electromagnetic energy. The electromagnetic energy generated in coils 81 conducts to, or is otherwise imparted to, electrical wiring 90 wired between coils 81 and power converter 91 mounted onboard vehicle 65. As with all the embodiments specified in this disclosure, conventional wiring techniques are utilized to electrically wire electrical wiring 90 to coils 81 and to power converter 91, further details of which will readily occur to the skilled electrician and form no part of the invention. The electromagnetic energy imparted to coils 81 is received by electrical wiring 90 and is conducted to power converter 91, which converts the incoming electromagnetic energy into direct current electrical power, which is, in turn, transmitted through electrical wiring 92 to, for instance, a battery power source 93 that is, in turn, electrically coupled to supply electrical power to selected electrical equipment onboard the vehicle 65, in accordance with the principle of the invention. The electrical power provided to battery power source 93, which may consist of a single battery or a plurality of batteries or battery pack or other selected battery form, serves to recharge the battery power source 93 or otherwise maintain battery power source 93 with power. Capacitors may also be associated with battery power source 93. According to the principle of the invention, electrical power generator 22 associated between carrier 60 and wheel 21 utilizes the rotation of wheel 21 relative to carrier 60 to generate electrical power that may be put to use for any desired or selected purpose, such as to providing recharging energy to battery power source 93 for, in turn, providing useful energy to selected equipment onboard vehicle 65, and/or for providing power directly to selected equipment onboard vehicle 65.

With continuing reference to FIG. 2, wheel assembly 20 is fashioned with a spinner 100 forming part of electrical power generator 22. Spinner 100 is a wheel cover, and is mounted to wheel 21 adjacent to the outer side of wheel 21 for rotation independently of wheel 21. Referencing FIG. 2, a rotary connector 101 is mounted centrally of circular frame 30 at hub 31 on outer face 41. In this embodiment, rotary connector 101 is formed in a fixture 102 affixed to outer face 41 of wheel 21 with threaded fasteners 103, although rivets, nut-and-bolt assemblies and the like may be used, if desired.

Spinner 100 consists of a circular frame 110 including a central hub 111 and an outer perimeter edge 112. Outer perimeter edge 112 is formed with an outwardly directed annular tongue 113, which is received in, and relates to, a corresponding annular groove 114 formed in the outer side of wheel 21 adjacent to rim 36. Circular frame 110 has an inner face 115 and an opposed outer face 116. For reference purposes, inner face 115 of circular frame 110 forms the inner side of spinner 100, and outer face 116 of circular frame 110 forms the outer side of spinner 100. Hub 111 is mounted to rotary connector 101 formed on outer face 41 of wheel 21, which rotatably couples spinner 100 for rotation independently of wheel 21. Inner face 115 of spinner 100 is spaced from and substantially parallel to outer face 41 of circular frame 30. The axis of rotation of spinner 100 is the same as the axis of rotation of wheel 21. Spinner 100 is fashioned of steel, aluminum, fiberglass, carbon fiber, plastic, or other rigid material, substantially rigid material, or combination of rigid and/or substantially rigid materials, and is received in, and generally relates to, cavity 55. Tongue 113 rides within annular groove 114 as spinner 100 rotates.

The outer side wheel 21 carries an array of magnets 120, and the inner side of spinner 100 carries a corresponding array of coils 121, in accordance with the principle of the invention. In the present embodiment, the array of magnets 120 formed on the outer side of wheel 21 includes an array of magnets 80 formed on outer face 41 of circular frame 30, and the array of coils 121 formed on the inner side of spinner 100 includes an array of coils 121 formed on inner face 115 of spinner 100. The array of magnets 120 formed on outer face 41 of circular frame 30 consists of circumferential arrays 120A, 120B, and 120C of magnets 120 encircling hub 31. The array of coils 121 formed on inner face 115 of spinner consists of circumferential arrays 121A, 121B, and 121C of coils 121 encircling hub 111. Arrays 120A, 120B, and 120C of magnets 120 are spaced from, oppose, are substantially parallel to and correspond with arrays 121A, 121B, and 121C of coils 121. As a matter of illustration and reference, FIG. 3 is a front elevational view of wheel assembly 20 with portions thereof broken away illustrating a portion circumferential arrays 120A, 120B, and 120C of magnets 120 carried by circular frame 30 of wheel 21.

Magnets 120 are entirely conventional, and are each mounted in a corresponding recess or pocket 122 formed in spinner 100. Magnets 120 are fixedly mounted to spinner 100 with screws or other suitable fastener, and may, if desired, be applied to spinner and then encased in a protective casing, such as a resin protective casing or other form of protective casing. Coils 121 each comprise a selected number of turns of conductive wire, preferably insulated conductive wire, whereby all coils 121 are wound in the same direction and are preferably wired together thereby being electrically connected.

Rotary connector 101 isolates spinner 100 from wheel 21. In response to rotation of spinner 100 relative to wheel 21, magnets 120 rotate relative to wheel 21 and coils 121 whereby the magnetic energy imparted by magnets 120 energizes coils 121 with electromagnetic energy. Coils 121 are electrically connected to rotary connector 101 with electrical wiring, whereby the electromagnetic energy generated in coils 121 conducts to, or is otherwise imparted to, to rotary connector 101.

According to the invention, rotary connector 101 coupling spinner 100 to wheel 21 is a rotary electrical connector, or what may otherwise be referred to as an electrical rotary connector. Electrical wiring 125 is coupled between rotary connector 101 and power converter 91 mounted onboard vehicle 65, and electrical wiring 138 is coupled between rotary connector 101 and coils 121. The described electrical wiring electrically connecting coils 121 to rotary connector 101, and rotary connector 101 to power converter 91 is formed conventionally according to the skill attributed to the skilled electrician, which is the case with all electrical wiring utilized in the various embodiments of the invention. Electrical wiring 138 receives the electromagnetic energy imparted from coils 121, which, in turn, conducts the electromagnetic energy to rotary connector 101. The electromagnetic energy imparted to rotary connector 101 is, in turn, received by electrical wiring 125, which conducts the electromagnetic power to power converter 91, which converts the incoming electromagnetic energy into direct current electrical power, which is, in turn, transmitted through electrical wiring 92 to, for instance, a battery power source 93 that is, in turn, electrically coupled to supply electrical power to selected electrical equipment onboard the vehicle 65, in accordance with the principle of the invention. According to the principle of the invention, electrical power generator 22 associated between spinner 100 and wheel 21 utilizes the rotation of spinner 100 relative to wheel 21 to generate electrical power that may be put to use for any desired or selected purpose, such as to providing recharging energy to battery power source 93 for, in turn, providing useful energy to selected equipment onboard vehicle 65, and/or for providing power directly to selected equipment onboard vehicle 65. And so the electrical power generated between spinner 100 and wheel 21 is supplied in addition to the electrical power generated between wheel 21 and carrier 60 thereby providing increased electrical power generation. If desired, power from power converter 91 may, if desired, be electrically coupled directly to selected electrical equipment onboard vehicle 65 for directly powering such equipment.

Figure 5:
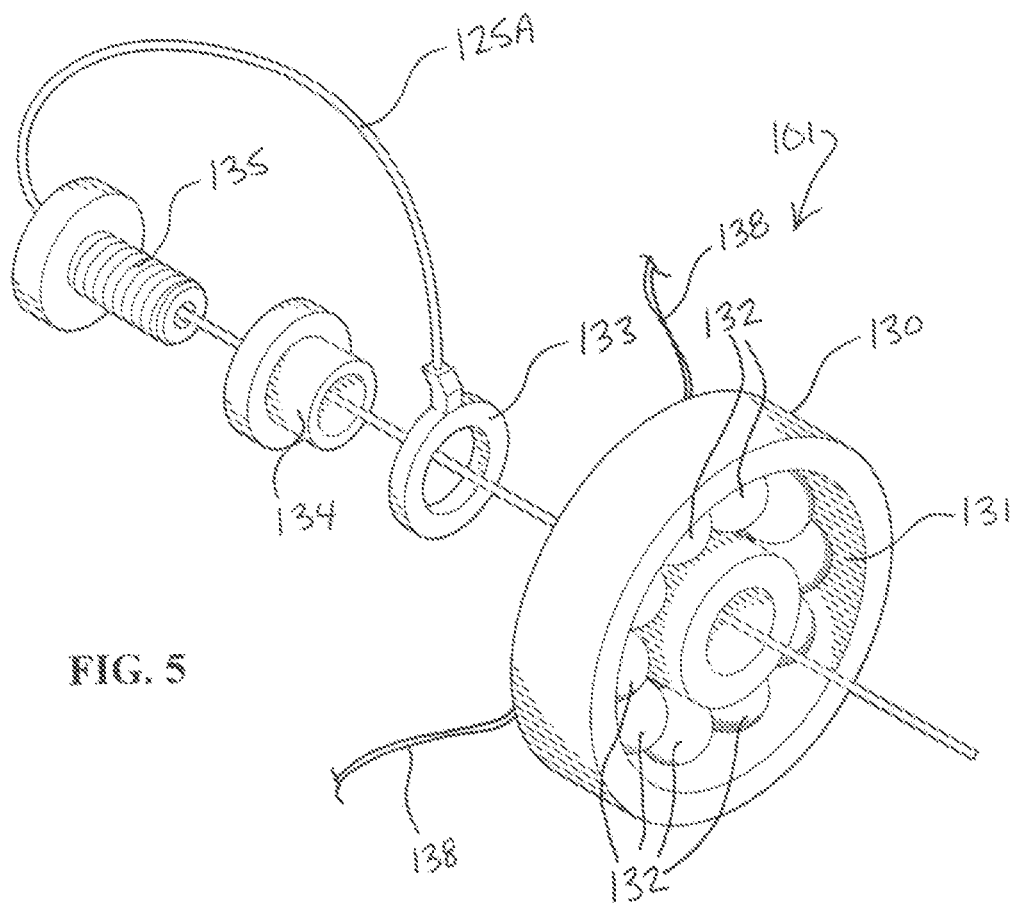
FIG. 5 is an exploded perspective view of a rotary electrical connector of the wheel assembly of FIG. 1.

Referring to FIG. 5, rotary connector 101 consists of a conductive annular body 130 electrically connected to, or otherwise wired to, electrical wiring 138. Annular body 130 is formed with an annular race 131 that accepts a ring of conductive ball bearings 132. A conductive washer 133 encircles the neck of a conductive plug 134, through which passes a threaded nonconductive fastener 135 that is threadably secured to annular body 130. Conductive washer 133 conductively contacts annular body 130. Looking back to FIG. 2, annular body 130 is press fit into a corresponding central opening formed in hub 111 of spinner 100. Electromagnetic energy conducted to annular body 130 from coils 121 via electrical wiring 138 is, in turn, transmitted from annular body 130 to washer 133. An electrical wire 125A forming at least part of electrical wiring 125 is coupled between washer 133 and power converter 91 electrically coupling rotary connector 101, and thus coils 121 of spinner 100, to power converter 91. Wire 125A extends from washer 133 and concurrently through fastener 135, plug 134, washer 133 and annular body 130 and, as seen in FIG. 2, into and through a channel 137 extending along the common axis of rotation of wheel 21 and spinner 100 from rotary connector 101 through fixture 102, hub 31 of circular frame 30, rotor 50, and axle 51, and then outwardly therefrom to power converter 91.

Rotary connector 101 is a preferred rotary electrical connector in that is inexpensive and simple to manufacture. Those having ordinary skill will readily appreciate that other suitable forms of rotary electrical connectors can be used without departing from the invention, not the least of which include the exemplary rotary electrical connectors found under the exemplary trademark MERCOTAC.

Spinner 100 rotates independent of wheel 21 in the driving of vehicle 65. According to the principle of the invention, spinner 100 is preferably constructed and arranged to rotate in a direction opposite to that of wheel 21 in response to interaction with an air stream passing relative to wheel 21 as wheel 21 is driven for rotation over a surface, such as through the normal driving of vehicle 65 over a road or other selected driving surface. To accomplish this, spinner 100 incorporates aerofoils 140 encircling hub 111. In this particular embodiment spinner 100 is fashioned with four equally spaced-apart aerofoils encircling hub 111, although less or more may be used. Aerofoils 140 are carried by spinner 100 and are each identical. Accordingly, the structure of only one aerofoil 140 will be discussed with the understanding that the ensuing discussion applies to each of aerofoils 140. For ease of reference and discussion, the aerofoil to be discussed presently is denoted at 140'.

Figure 6:
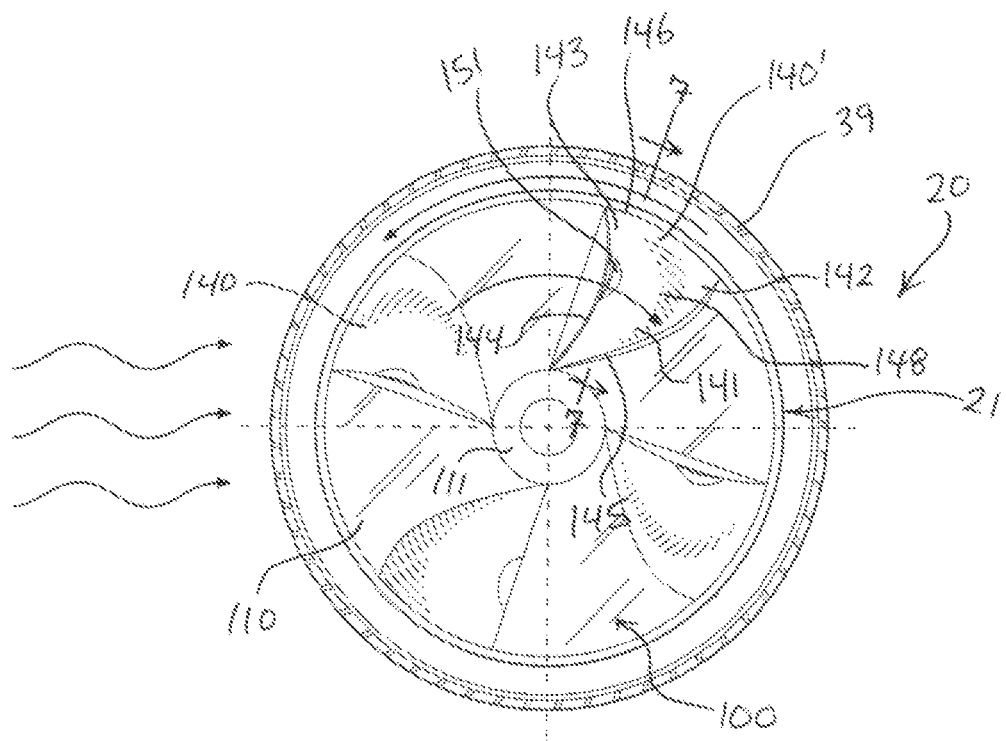
FIG. 6 is a front elevational view of the wheel assembly of FIG. 1 illustrating an air stream passing relative to the wheel assembly.

Referencing FIGS. 1 and 6, aerofoil 140' is adapted to interact with an air stream passing relative to wheel 21 in response to the rotation of wheel 21 in a first rotational direction for setting spinner 100 in rotational motion in a second rotational direction opposite to the first rotational direction. Through the rotation of spinner 100 in a rotational direction opposite to the rotational direction of wheel 21, the generation of electromagnetic power in coils 121 is increased, according to the principle of the invention.

Aerofoil 140' consists of a wide, thin body 141. In this specific embodiment, airfoil 140' is formed of resilient material such as thin, flexible plastic, fiberglass, carbon fiber or other selectively resilient material or combination of resilient materials. Body 141 has a proximal end 142, which is narrowed, attached to spinner 100, an opposed broad, free distal end 143 defining an elongate marginal edge 144, and opposed side edges 145 and 146, and opposed concave and convex surfaces 147 and 148 as referenced in FIG. 7, which is a sectional view taken along line 7-7 of FIG. 6. A broad recess 150 is formed in outer face 116 of spinner 100. Body 141 is received in recess 150, whereby concave surface 147 faces inwardly toward recess 150, convex surface 148 faces outwardly away from recess 150, and side edges 145 and 146 confront opposed marginal extremities 150A and 150B, respectively, of recess 150. A winglet 151 attached to convex surface 148 proximate distal end 143 at marginal edge 144 projects outwardly relative to convex surface 148.

Figure 7:
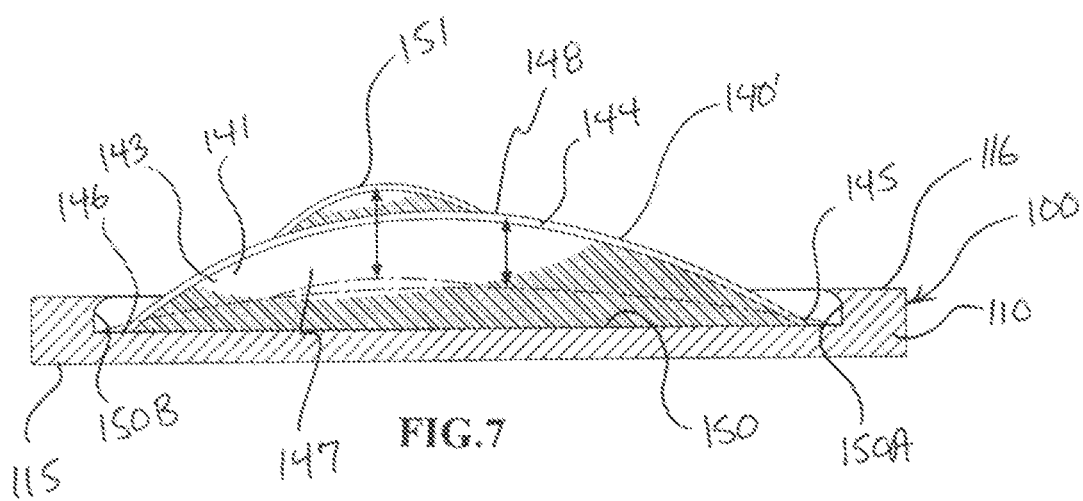
FIG. 7 is a sectional view taken along line 7-7 of FIG. 6.

The resiliency of aerofoil 140' causes aerofoil 140' to displace or move between an initial retracted position relative to spinner 100 as indicated in dotted outline in FIG. 7 and a deployed position relative to spinner 100 as illustrated in FIG. 7 in response to application of an air stream applied to aerofoil 140' in a direction toward marginal edge 144. When vehicle 65 is driven causing wheel 21 to rotate over a road or other driving surface, the resulting air stream passing by or otherwise relative to wheel 21 initially interacts with the winglet 151 initially drawing aerofoil 140' out of the initial retracted position toward the deployed position thereby drawing marginal edge 144 into the passing air stream. When marginal edge 144 receives the oncoming air stream, the air diverts against concave surface 147, which catches the air stream displacing or otherwise drawing aerofoil 140' outwardly away from recess 150 into the fully deployed position and, as a result, imparts forcible rotation to spinner 100 in a rotational direction opposite to that of the rotational direction of wheel 21.

As spinner 100 rotates, aerofoil 140' is concurrently drawn about concurrently taking distal end 143 out of confrontation with the oncoming air stream directing proximal end 142 into the air stream. Because proximal end is directed toward spinner 100, the air stream is prevented from passing along concave surface 147, in which case the oncoming air stream will direct against convex surface 148 causing aerofoil 140' to at least partially withdrawn from the deployed position toward the retracted position reducing the resistance between the oncoming air stream and aerofoil 140' until further rotation of spinner 100 again brings winglet 150 and marginal edge 144 into confrontation with the oncoming air stream causing aerofoil 140' to again catch the oncoming air stream and deploy urging rotation of spinner 100 in direction opposite to that of wheel 21, according to the principle of the invention.

Aerofoils 140 each operate in this way causing spinner 100 to rotate in a rotational direction opposite to that of wheel 21 as wheel rotates in the opposing rotational direction along a road or other driving surface. Any suitable form of airfoil may be utilized in connection with spinner 100 for imparting rotation to spinner 100 in a rotational direction opposite to the rotational direction of wheel 21 in response to interaction with an airstream passing relative thereto wheel 21 and spinner 100.

As spinner 100 spins faster and faster, centripetal forces applied to the aerofoils 140 force the aerofoils 140 into the deployed positions preventing the aerofoils 140 from moving out of the deployed positions. However, as the spinning of spinner 100 slows and the centripetal forces diminish, the tension springs are permitted to bias the aerofoils 140 from the deployed position to the retracted positions. Because aerofoils 140 are each at least partially received in a corresponding recess formed in spinner 100, they are prevented from sticking out and becoming damaged, such as against a curb or other structure.

Figure 8:
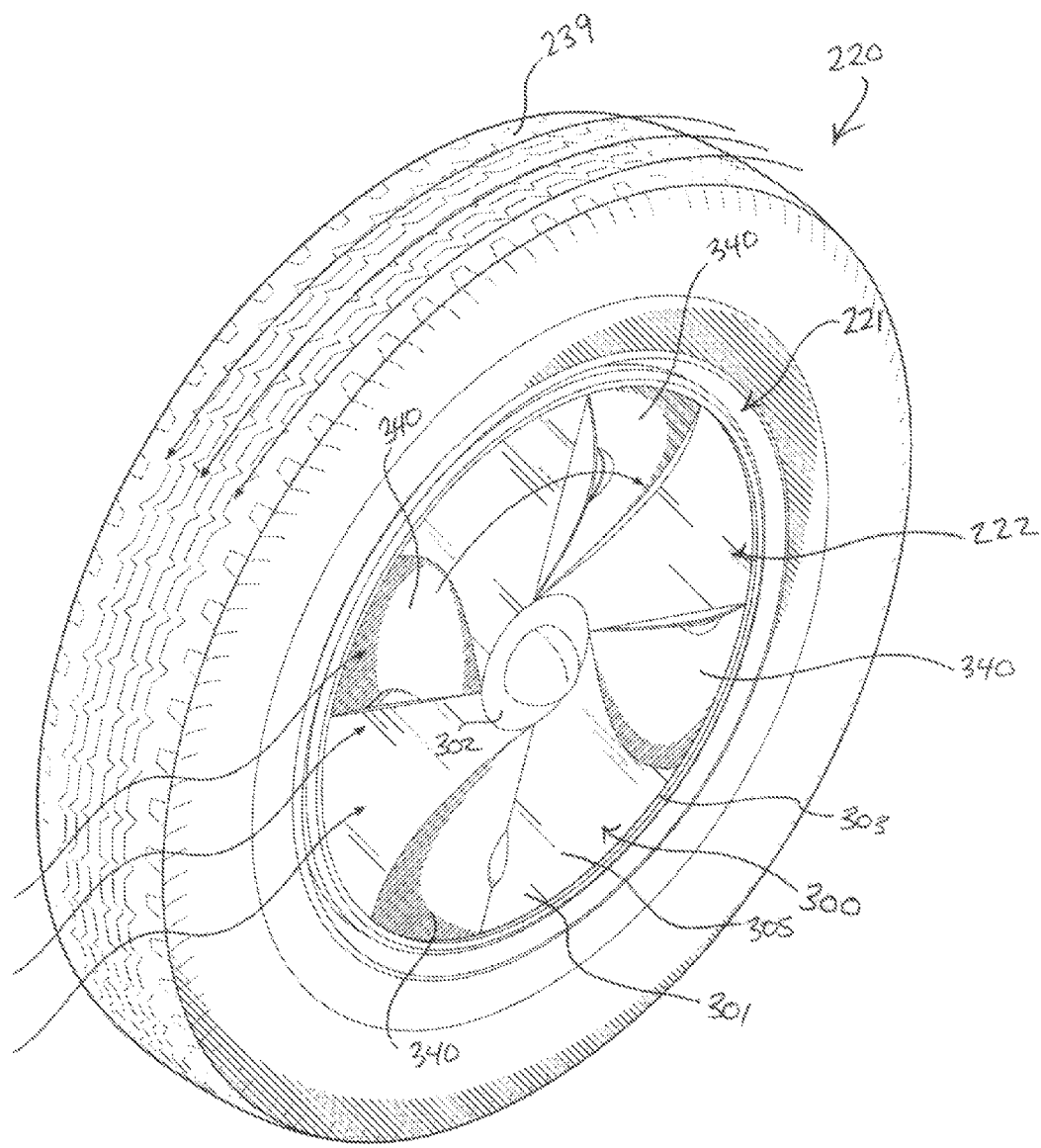
FIG. 8 is a perspective view of another embodiment of a wheel assembly incorporating an electric power generated constructed and arranged in accordance with the principle of the invention.

Reference is now made to FIG. 8, in which there is seen another embodiment of a wheel assembly constructed and arranged in accordance with the principle of the invention and generally designed by the reference character 220. Wheel assembly 220 consists of a wheel 221 incorporating an electrical power generator 222 that generates electrical power in response to rotation of wheel 221, in accordance with the principle of the invention.

Figure 9:
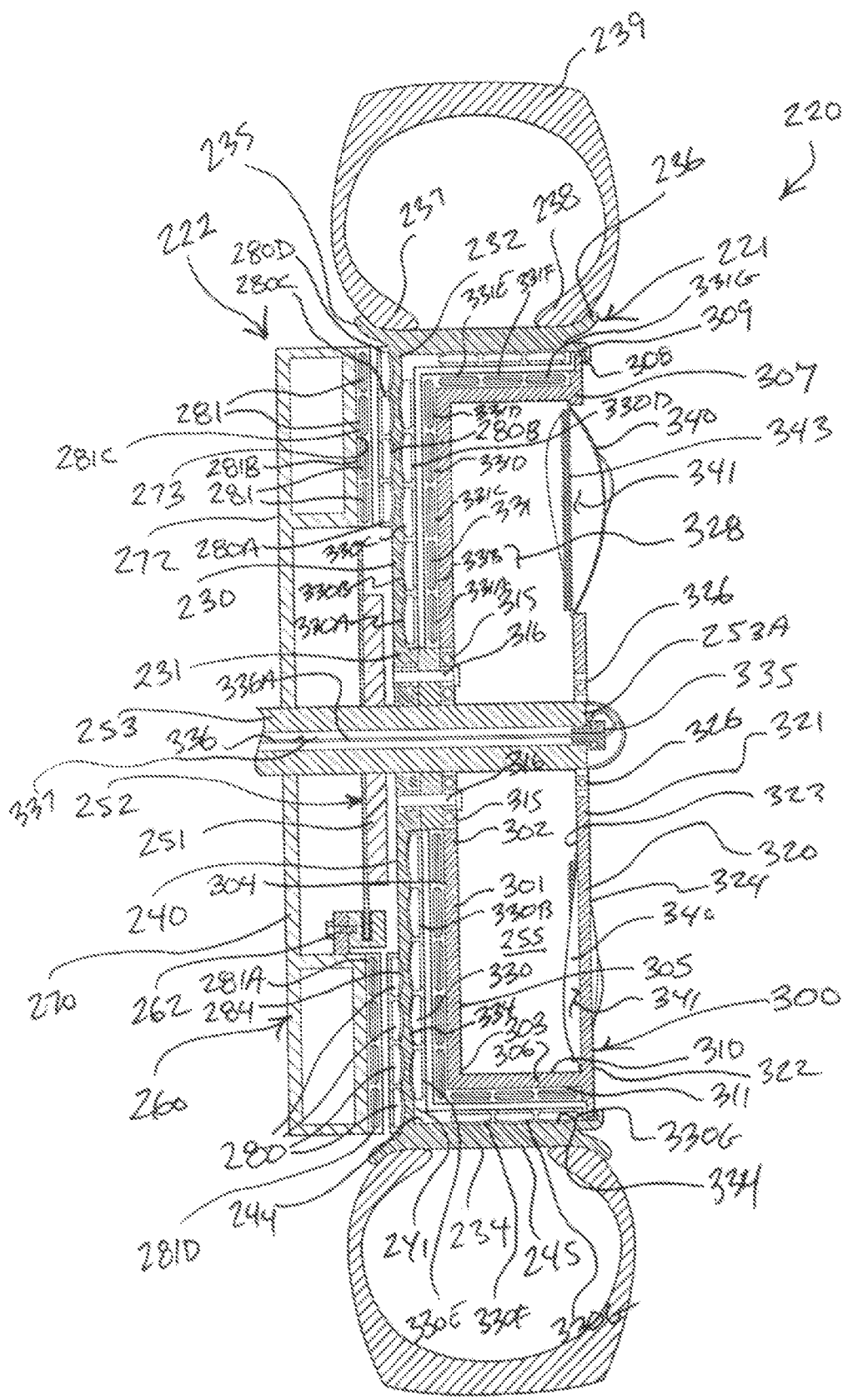
FIG. 9 is a sectional view taken along line 9-9 of FIG. 8.

Referencing FIG. 9, which is a sectional view taken along line 9-9 of FIG. 8, wheel 221 consists of an upright circular frame 230 including a central hub 231 and a circular outer perimeter edge 232. An annular sidewall 234 is affixed to outer perimeter edge 232, and is substantially perpendicular relative to circular frame 230. Annular sidewall 234 is formed with opposed annular rims 235 and 236 that accept beads 237 and 238, respectively, of a conventional tire 239. Outer perimeter edge 232 is attached to annular sidewall 234 between opposed annular rims 235 and 236, in this embodiment being closer to annular rim 235.

Circular frame 230 has an inner face 240, and an opposed outer face 241. Annular sidewall 234 has an annular inner face 244 facing inwardly toward circular frame 230, and an opposed annular outer face 245, which is the tire-facing side of annular sidewall 34. Annular inner face 244 is perpendicular relative to inner face 240 and outer face 241. For reference purposes, outer face 241 of circular frame 230 and annular inner face 244 of annular sidewall 234 extending outwardly relative to outer face 241 of circular frame 230 cooperate to form the outer side of wheel 221, and inner face 240 of circular frame 230 forms the inner side of wheel 221. Hub 231 is affixed to a rotating axle 253 of vehicle 252, whereby wheel 221 rotates in response to rotation of axle 253. In this embodiment, wheel 221 encircles axle 253. A receiving area, wheel well, or cavity 255 is defined by the outer side of wheel 221, namely, outer face 241 of circular frame 230 and annular inner face 244 of annular sidewall 234 extending outwardly relative to outer face 241 of circular frame 230. Wheel 221 is generally representative of a truck wheel.

According to the principle of the invention, electric power generator 222 of wheel assembly 220 incorporates a carrier 260 affixed to vehicle frame 251 of vehicle 252, in this embodiment with threaded fasteners 262 although rivets, nut-and-bolt assemblies or the like may be used, if desired. Carrier 260 encircles axle 253 adjacent to the inner side of wheel 221, and wheel 221 rotates with axle 253 relative to carrier 260. Carrier 260 is fashioned of steel, aluminum, fiberglass, carbon fiber, plastic, or other rigid or substantially rigid material or combination of materials.

Carrier 260 consists of generally circular body 270 including an inner face 272, and an opposed outer face 273. Inner face 272 faces inwardly away from inner face 240 of wheel 221, and outer face 273 faces inner face 240 of circular frame 230 and is substantially parallel to, and spaced from, inner face 240. Inner face 272 forms the inner side of carrier 260, and outer face 273 forms the outer side of carrier 260 according to this disclosure.

The inner side of wheel 221 carries an array of magnets 280, and the outer side of carrier 260 carries a corresponding array of coils 281. In the present embodiment, the array of magnets 280 formed on the inner side of wheel 221 includes an array of magnets 280 formed on inner face 240 of circular frame 230, and the array of coils 281 formed on the outer side of carrier 260 includes an array of coils 281 formed on outer face 273 of body 270. The array of magnets 280 formed on inner face 240 of circular frame 230 consists of circumferential arrays 280A, 280B, 280C, and 280D of magnets 280 encircling hub 231. The array of coils 281 formed on outer face 273 of body 270 consist of circumferential arrays 281A, 281B, 281C, and 281D of coils 281 encircling hub 271. Arrays 280A, 280B, 280C, and 280D of magnets 80 are spaced from, oppose, and substantially parallel to and correspond with arrays 281A, 281B, 281C, and 281D of coils 281.

Magnets 280 are entirely conventional, and are each mounted in a corresponding recess or pocket 284 formed in wheel 221. Magnets 280 are fixedly mounted to wheel 221 with screws or other suitable fastener, and may, if desired, be applied to wheel 221 and then encased in a protective casing, such as a resin protective casing or other form of protective casing. Coils 281 each comprise a selected number of turns of conductive wire, preferably insulated conductive wire, whereby all coils 281 are wound in the same direction and are preferably wired together thereby being electrically connected.

Carrier 260 is a non-moving part constituting a stator, whereby wheel 221 rotates relative to carrier 260. In response to rotation of wheel 221 relative to carrier 260, such as in response to a driving of vehicle 252 in the normal manner causing wheel 221 to rotate relative to the road or other surface over which the vehicle is driven, magnets 280 rotate relative to carrier 260 and coils 281 whereby the magnetic energy imparted by magnets 280 energizes coils 281 with electromagnetic energy. The electromagnetic energy generated in coils 281 conducts to, or is otherwise imparted to, electrical wiring (not shown) wired between coils 281 and a power converter (not shown) mounted onboard vehicle 252. Conventional wiring techniques are utilized to electrically wire the electrical wiring to coils 281 and to the power converter, further details of which will readily occur to the skilled electrician. The electromagnetic energy imparted to coils 281 is received by the electrical wiring and is conducted to the power converter, which converts the incoming electromagnetic energy into direct current electrical power, which is, in turn, transmitted through electrical wiring to, for instance, a battery power source that is, in turn, electrically coupled to supply electrical power to selected electrical equipment onboard the vehicle 252, in accordance with the principle of the invention.

The electrical power provided to the battery power source electrically coupled to wheel assembly 220, which may consist of a single battery or a plurality of batteries or battery pack or other selected battery form, serves to recharge the battery power source or otherwise maintain the battery power source with power. According to the principle of the invention, electrical power generator 222 associated between carrier 260 and wheel 221 utilizes the rotation of wheel 221 relative to carrier 260 to generate electrical power that may be put to use for any desired or selected purpose, such as to providing recharging energy to a battery power source for, in turn, providing useful energy to selected equipment onboard the vehicle, and/or for providing power directly to selected equipment onboard the vehicle. As with the previous embodiment designated at 20, power from the power converter may, if desired, be electrically coupled directly to selected electrical equipment onboard the vehicle for directly powering such equipment.

Wheel assembly 220 is fashioned with a spinner 300 forming part of electrical power generator 222. Spinner 300 is a wheel cover, and is mounted to wheel 221 and axle 253 adjacent to the outer side of wheel 221 for rotation independently of wheel 221 and axle 253. Spinner 300 is received in, and generally relates to, cavity 255. Spinner 300 is fashioned of steel, aluminum, fiberglass, carbon fiber, plastic, or other rigid material or combination of rigid or substantially rigid materials or substantially rigid materials, and is received in, and generally relates to, cavity 55.

Spinner 300 consists of a circular frame 301 disposed in cavity 255 along side circular frame 230 of wheel 221. Circular frame 301 includes a central hub 302, an outer perimeter edge 303, an inner face 304 opposing and spaced from and substantially parallel to outer face 241 of wheel 221, and an opposed outer face 305. An annular sidewall 306 is affixed to outer perimeter edge 303, and is substantially perpendicular relative to circular frame 301. Annular sidewall 306 extends outwardly away from outer perimeter edge 303 and outer face 305, and terminates with an annular rim 307 inwardly of and opposing rim 236 of wheel 221, and which is formed with an outwardly directed annular tongue 308, which is received relative to a corresponding annular seat 309 formed in the outer side of wheel 221 adjacent to rim 236. Annular sidewall 306 is located in cavity 255 inwardly of annular sidewall 234 of wheel 221, and includes an annular inner face 310 and an opposed annular outer face 311 spaced from, opposing, and substantially parallel to annular inner face 244 formed between perimeter edge 232 and annular rim 236. For reference purposes, inner face 304 of circular frame 301 and annular outer face 311 of annular sidewall 306 cooperate to form the inner side of spinner 300, and outer face 305 of circular frame 301 and annular inner face 310 of annular sidewall 306 cooperate forming the outer side of spinner 300. Hub 302 of circular frame 301 encircles axle 253. Hub 302 is rotated to rotary bearings 315 on either side of axle 253, which are, in turn, affixed to hub 231 at outer face 241 of wheel 221 with threaded fasteners 316, although rivets, nut-and-bolt assemblies and the like may be used, if desired.

Spinner 300 further incorporates a circular frame 320 spaced from, opposing, and substantially parallel to circular frame 301. Circular frame 320 includes a central hub 321, an outer perimeter edge 322 affixed to annular rim 307, an inner face 323 opposing and spaced from and substantially parallel to outer face 305 of circular frame 301, and an opposed outer face 324. Hub 321 of circular frame 320 encircles axle 253 and is rotated to axle 253 with rotary bearings 326 formed in hub 321. Outer face 305 of circular frame 301, annular inner face 310 of annular sidewall 306, and inner face 323 of circular frame 320 cooperate forming a cavity, chamber, or compartment 328 of spinner 300.

The outer side of wheel 221 carries an array of magnets 330, and the inner side of spinner 300 carries a corresponding array of coils 331. In the present embodiment, the array of magnets 330 formed on the outer side of wheel 221 includes an array of magnets 330 formed on outer face 241 of circular frame 230 and an array of magnets 330 formed on annular inner face 244 of annular sidewall 234 substantially perpendicular to the array of magnets 330 formed in outer face 241, and the array of coils 331 formed on the inner side of spinner 300 includes an array of coils 331 formed on inner face 304 of circular frame 301 and an array of coils 331 formed on annular outer face 311 of annular sidewall 306 substantially perpendicular to the array of coils 331 formed in inner face 304.

The array of magnets 330 formed on outer face 241 of circular frame 230 consists of circumferential arrays 330A, 330B, 330C, 330D, and 330E of magnets 330 encircling hub 231, and the array of magnets 330 formed on annular inner face 244 of annular sidewall 234 consists of circumferential annular arrays 330F, 330G, and 330H of magnets 330. The array of coils 331 formed on inner face 304 of circular frame 301 consists of circumferential arrays 331A, 331B, 331C, 331D, 331E, and 330F of coils 331 encircling hub 302, and the array of coils 331 formed on annular outer face 311 of annular sidewall 306 consists of circumferential annular arrays 331F, 331G, and 331H of coils 331. Arrays 330A, 330B, 330C, 330D, and 330E of magnets 330 are spaced from, oppose, are substantially parallel relative to and correspond with arrays 331A, 331B, 331C, 331D, and 331E of coils 331, and arrays 330F, 330G, and 330H of magnets 330 are spaced from, oppose, are substantially parallel relative to and correspond with arrays 331F, 331G, and 331H of coils 331.

Magnets 330 are entirely conventional, and are each mounted in a corresponding recess or pocket 334 formed in wheel 221. Magnets 330 are fixedly mounted to wheel 221 with screws or other suitable fastener, and may, if desired, be applied to wheel 221 and then encased in a protective casing, such as a resin protective casing or other form of protective casing. Coils 331 each comprise a selected number of turns of conductive wire, preferably insulated conductive wire, whereby all coils 331 are wound in the same direction and are preferably wired together thereby being electrically connected.

Rotary bearings 315 and rotary bearing 326 together isolate spinner 300 from wheel 221 and axle 253. In response to rotation of spinner 300 relative to wheel 221, coils 331 rotate relative to magnets 330 whereby the magnetic energy imparted by magnets 330 energizes coils 331 with electromagnetic energy. Axle 253 has a free end 253A fashioned with a rotary electrical connector 335 coupled between hub 321 of circular frame 320 and free end 253A of axle 253, which is identical in structure in every respect to rotary connector 101 previously discussed in connection with wheel assembly 20. Coils 331 are electrically connected to rotary electrical connector 335 with electrical wiring (not shown), whereby the electromagnetic energy generated in coils 331 conducts to, or is otherwise imparted to, rotary electrical connector 335. Electrical wiring 336 is coupled between rotary electrical connector 335 and a power converter (not shown) mounted onboard vehicle 252. Rotary electrical connector 335 receives the electromagnetic energy from coils 331. The electromagnetic energy imparted to rotary connector 335 is, in turn, received by electrical wiring 336, which conducts the electromagnetic power to the power converter, which converts the incoming electromagnetic energy into direct current electrical power, which is, in turn, transmitted through electrical wiring to, for instance, a battery power source (not shown) that is, in turn, electrically coupled to supply electrical power to selected electrical equipment onboard the vehicle 252, in accordance with the principle of the invention. If desired, power from the power converter may, if desired, be electrically coupled directly to selected electrical equipment onboard vehicle 65 for directly powering such equipment. Electrical wiring 336 is formed by an electrical wire that extends from rotary electrical connector 335 and into and through a channel 337 extending centrally through axle 253 to the power converter.

According to the principle of the invention, electrical power generator 222 associated between spinner 300 and wheel 221 utilizes the rotation of spinner 300 relative to wheel 221 to generate electrical power that may be put to use for any desired or selected purpose, such as to providing recharging energy to a battery power source for, in turn, providing useful energy to selected equipment onboard the vehicle, and/or for providing power directly to selected equipment onboard the vehicle. And so the electrical power generated between spinner 300 and wheel 221 is supplied in addition to the electrical power generated between wheel 221 and carrier 260 thereby providing increased electrical power generation. Although magnets 330 are carried by wheel 221 and coils 331 are carried by spinner 300, this can be reversed, if desired.

Spinner 300 rotates independent of wheel 221 in the driving of vehicle 252, and is preferably adapted and arranged to rotate in a direction opposite to that of wheel 221 in response to interaction with an air stream passing by or otherwise relative to wheel 221 as wheel 221 is driven for rotation over a surface, such as through the normal driving of vehicle 252 over a road or other selected driving surface. To accomplish this, spinner 300 incorporates aerofoils 340 attached to circular frame 320 of spinner 300 and which encircle hub 321. In this particular embodiment spinner 300 is fashioned with four aerofoils disposed at spaced intervals encircling hub 321, although less or more may be used.

Aerofoils 340 are each adapted to interact with an air stream passing relative to wheel 221 in response to the rotation of wheel 221 in a first rotational direction for setting spinner 300 in rotational motion in a second rotational direction opposite to the first rotational direction. Through the rotation of spinner 300 in a rotational direction opposite to the rotational direction of wheel 221, the generation of electromagnetic power in coils 331 is dramatically increased, according to the principle of the invention.

Aerofoils 340 are each identical in structure to each aerofoil 140 discussed previously in connection with wheel assembly 20 and will not be again discussed in great detail. As with aerofoils 140 each include a proximal end, an opposed broad, free distal end defined by an elongate marginal edge, opposed side edges, an inwardly directed concave surface and an opposed outwardly directed convex surface, and a winglet attached adjacent to the marginal edge and extending outwardly relative to the convex outer surface. Referencing FIG. 9, each aerofoil 340 is mounted at an opening 341 formed through circular frame 320. With additional reference to FIG. 10, each aerofoil 340 pivotally displaces about an elongate rod 342 secured to circular frame 320 at opening 341 between an initial retracted position relative to spinner 300 and a deployed position relative to spinner 300 in response to application of an air stream thereto a direction toward the marginal edge. In FIG. 9, the uppermost one of aerofoils 340 is shown in the deployed position extending away from outer face 324 and the opening through circular frame 320 that the uppermost aerofoil is associated with, and the lowermost one of aerofoils 340 is shown in the retracted position projecting inwardly relative to inner face 323 and the opening through circular frame 320 that the lowermost aerofoil is associated with so as to be at least partially received in compartment 328.

Figure 10:
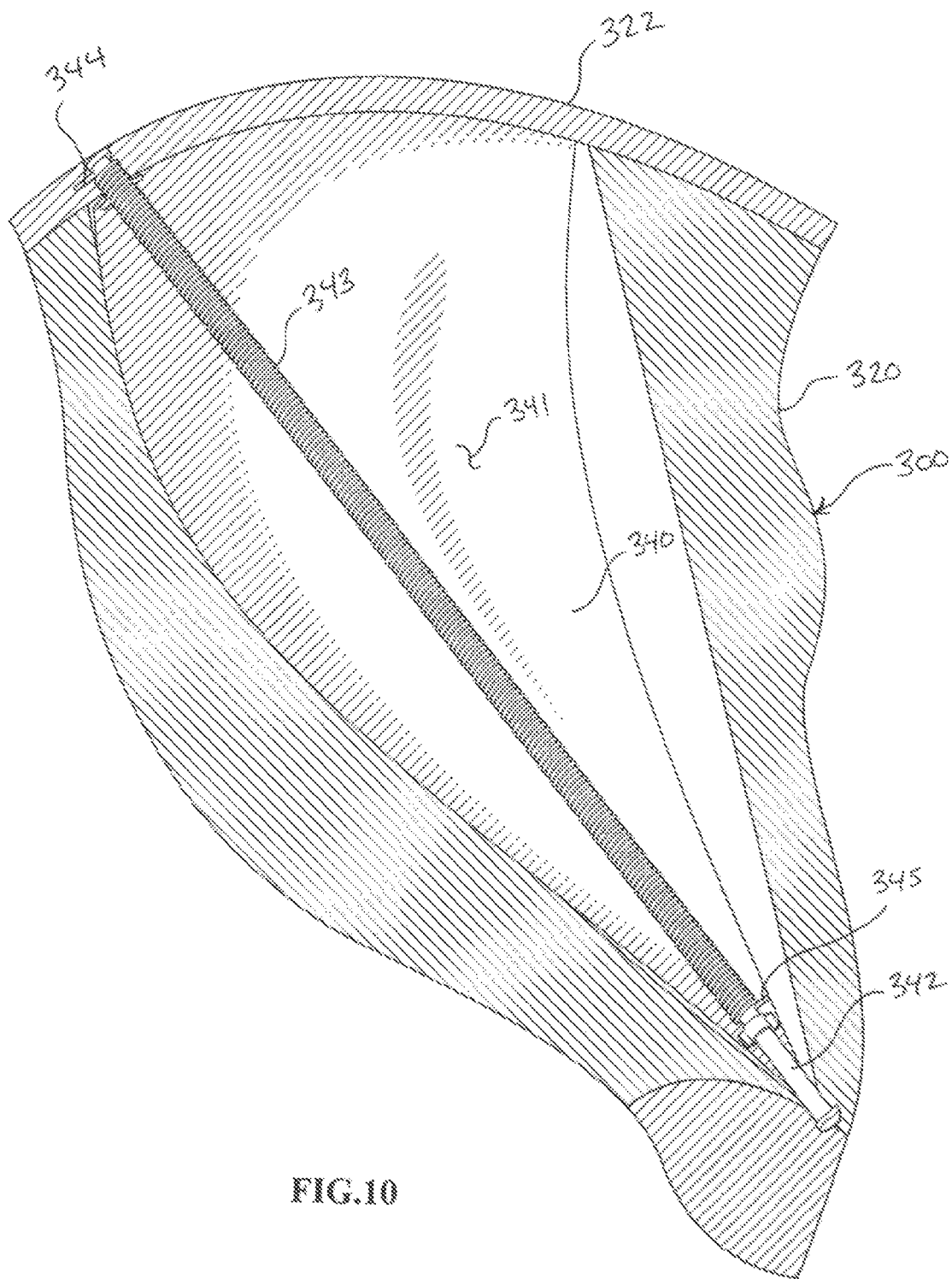
FIG. 10 is an enlarged fragmented perspective view of a spinner of the wheel assembly of FIG. 8 illustrating a spring applying a bias to an aerofoil of the spinner, which is adapted to interact with an air stream passing relative to the wheel assembly for setting the spinner in rotational motion.

Referencing FIG. 10, a tension spring 343 is wound about each elongate rod 342 and interacts between aerofoil 340 and circular frame 320 biasing aerofoil 340 into the retracted position, whereby tension spring 343 winds in response to movement of aerofoil 340 from the retracted position to the deployed position, and unwinds in response to movement of aerofoil 340 from the deployed position to the retracted position. Tension spring 343 includes a wire formed into coils encircling rod 342. In this specific embodiment, tension spring 343 has numerous active coils, in which the two opposing outermost coils lead to tag ends 344 and 345, in which tag end 344 interacts against circular frame 320 and tag end 345 interacts against aerofoil 340. Tension spring 343 is fashioned of spring steel, a nickel-based spring alloy, or other material or combination of materials having a substantially constant moduli of elasticity as is typical with tension springs. Tension spring 343 applies a forcible impulse against aerofoil 340 biasing aerofoil 340 in the retracted position.

When vehicle 252 is driven causing wheel 221 to rotate over a road or other driving surface, for each aerofoil 340 the winglet initially interacts with the oncoming air stream passing by or otherwise relative to wheel 221 initially pivotally displacing or otherwise drawing the aerofoil 340 out of the initial retracted position initially overcoming the bias applied by tension spring 343 toward the deployed position thereby drawing the marginal edge of the aerofoil 340 into the passing air stream. When marginal edge receives the oncoming air stream, the air is diverted against the concave surface of the aerofoil 340, which catches the air stream and draws the aerofoil 340 outwardly into the fully deployed position and imparts forcible rotation to spinner 300 in a rotational direction opposite to that of the rotational direction of wheel 221. As spinner 300 rotates, the aerofoil 340 will draw about concurrently taking the distal end thereof out of confrontation with the oncoming air stream directing the proximal end thereof into the air stream, in which the oncoming air stream will hit the convex outer surface thereof allowing the bias applied to the aerofoil 340 by the tension spring 343 to bias the aerofoil toward the retracted position from the deployed position reducing the resistance between the oncoming air stream and the aerofoil 340 until further rotation of spinner 300 again brings the winglet of the subject aerofoil 340 into the oncoming air stream causing the aerofoil 340 to again catch the oncoming air stream and deploy urging rotation of spinner 300 in direction opposite to that of wheel 221, according to the principle of the invention.

As spinner 300 spins faster and faster, centripetal forces applied to the aerofoils 340 force the aerofoils 340 into the deployed positions preventing the aerofoils 340 from moving out of the deployed positions. However, as the spinning of spinner 300 slows and the centripetal forces diminish, the tension springs are permitted to bias the aerofoils 340 from the deployed position to the retracted positions at least partially received in compartment 328. Because aerofoils 340 are at least partially received in compartment 328 when retracted, they are prevented from becoming damaged, such as against a curb or other structure. It is to be understood that any form or spring may be applied between each one of aerofoils 340 and circular frame 320 for biasing aerofoils 340 in the retracted position. Furthermore, any suitable form of airfoil may be utilized in connection with spinner 300 for imparting rotation to spinner 300 in a rotational direction opposite to the rotational direction of wheel 221 in response to interaction with an airstream passing relative thereto wheel 221 and spinner 300.

Figure 11:
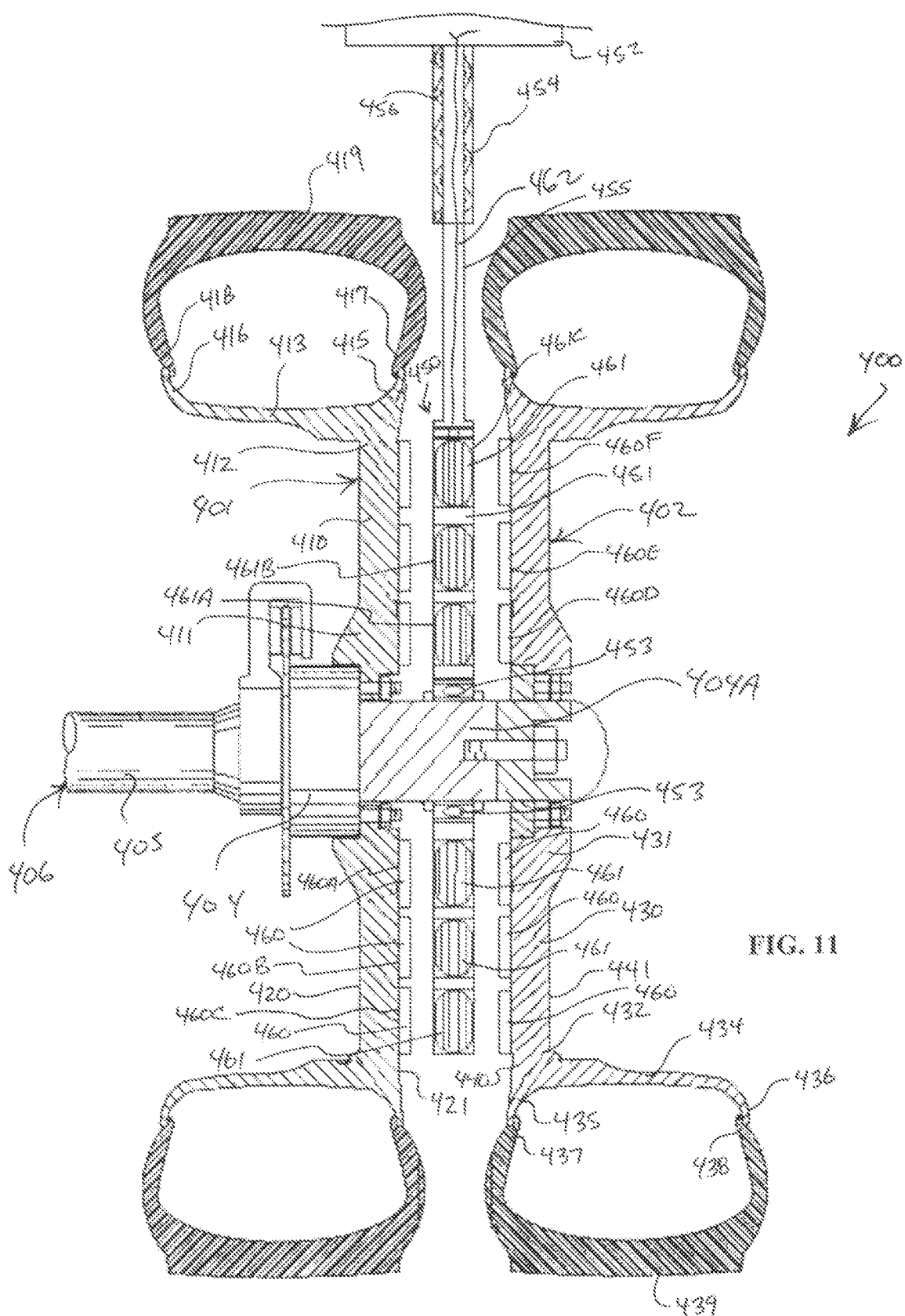
FIG. 11 is a vertical sectional view of yet another alternate embodiment of a wheel assembly incorporating an electric power generator constructed and arranged in accordance with the principle of the invention.

An electrical power generator constructed and arranged in accordance with the principle of the invention may be incorporated with any form of vehicle wheel. As a matter of example of yet another alternative form of vehicle wheel incorporating an electrical power generator, in FIG. 11 there is seen a dually wheel or assembly 400 consisting of opposed wheels 401 and 402 mounted together for rotation to an axle 405. In this embodiment, wheel 401 is the innermost wheel and wheel 402 is the outermost wheel. Wheel 401 is affixed to a rotor 404 mounted for rotation to axle 405 of a vehicle 406. Wheel 402 is, in turn, affixed to an extension 404A of rotor 404. Wheels 401 and 402 are equal in size and are disposed in spaced apart, substantially parallel relation, rotate together and represent a conventionally dually wheel arrangement commonly found among trucks.

Wheel 401 consists of an upright circular frame 410 including a central hub 411 and a circular outer perimeter edge 412. An annular sidewall 413 is affixed to outer perimeter edge 412, and is substantially perpendicular relative to circular frame 410. Annular sidewall 413 is formed with opposed annular rims 415 and 416 that accept beads 417 and 418, respectively, of a conventional tire 419. Outer perimeter edge 412 is attached to annular sidewall 413 between opposed annular rims 415 and 416, in this embodiment being closer to annular rim 415. Circular frame 410 has an inner face 420, and an opposed outer face 421. Outer face 421 forms the outer side of wheel 401.

Wheel 402 consists of an upright circular frame 430 including a central hub 431 and a circular outer perimeter edge 432. An annular sidewall 434 is affixed to outer perimeter edge 432, and is substantially perpendicular relative to circular frame 430. Annular sidewall 434 is formed with opposed annular rims 435 and 436 that accept beads 437 and 438, respectively, of a conventional tire 439. Outer perimeter edge 432 is attached to annular sidewall 434 between opposed annular rims 435 and 436, in this embodiment being closer to annular rim 435. Circular frame 430 has an inner face 440, and an opposed outer face 441. Inner face 440 forms the inner side of wheel 402. Inner face 440 of wheel 402 is spaced from, opposes, and is substantially parallel to outer face 421 of wheel 401.

According to the principle of the invention, an electric power generator 450 of wheel assembly 400 incorporates a carrier 451 affixed to vehicle frame 452 of vehicle 406, which is suspended from vehicle frame 452 between and substantially parallel to outer face 421 of wheel 401 and inner face 440 of wheel 402. Wheels 401 and 402 rotate together relative to carrier 451. Carrier 451 is a non-moving part constituting a stator, whereby wheels 401 and 402 rotate concurrently relative to carrier 451. Carrier 451 is fashioned of steel, aluminum, fiberglass, plastic, carbon fiber or other rigid material, substantially rigid material, or combination of rigid and/or substantially rigid materials. Carrier 451 encircles extension 404A is incorporates roller bearings 453 coupled between carrier 451 and extension 404A permitting extension 404A to rotate relative to carrier 451.

In the present embodiment, a damper 454 is coupled between vehicle frame 452 and carrier 451, which displaces in response to the displacement of vehicle frame 452 relative to axle 405 and extension 404A and carrier 451 encircling extension 404A. In this embodiment, damper 454 consists of a cylinder assembly including an arm 455 affixed to carrier 451 and which is partially received in a corresponding cylinder 456 affixed to vehicle frame 452. Arm 455 reciprocates relative to cylinder 456 in response to movement of vehicle frame 452 relative to axle 405 and extension 404A and carrier 451. Any suitable or selected form of damper may be incorporated between vehicle frame 452 and carrier 451 for coupling carrier 451 to vehicle frame 452 and allowing carrier 451 to move and displace relative to vehicle frame 452.

An array of magnets 460 is carried by the outer side of wheel 401, an array of magnets 460 is carried by the inner side of wheel 402, and a corresponding array of coils 461 is carried by carrier 451. In the present embodiment, the array of magnets 460 formed on the outer side of wheel 401 includes an array of magnets 460 formed on outer face 421 of circular frame 410, and the array of magnets 460 formed in the inner side of wheel 402 includes an array of magnets 460 formed in inner face 440 of wheel 402. The array of magnets 460 formed on outer face 421 of circular frame 410 consists of circumferential arrays 460A, 460B, and 460C of magnets 460 encircling hub 411, and the array of magnets 460 formed on inner face 440 of circular frame 430 consists of circumferential annular arrays 460D, 460E, and 460F of magnets 460 encircling hub 431. The array of coils 461 formed in carrier 460 consists of circumferential arrays 461A, 461B, and 461C of coils 81 encircling extension 404A. Arrays 460A, 460B, and 460C of magnets 460 are spaced from, oppose, and correspond with arrays 461A, 46B, and 461C of coils 461, and arrays 460D, 460D, and 460E of magnets 460 are spaced from, oppose, and correspond with arrays 461A, 461B, and 461C of coils 461.

Magnets 460 are entirely conventional, and are fixed in place with screws or other suitable fastener, and may, if desired, be set in place and then encased in a protective casing, such as a resin protective casing or other form of protective casing. Coils 461 each comprise a selected number of turns of conductive wire, preferably insulated conductive wire, whereby all coils 461 are wound in the same direction and are preferably wired together thereby being electrically connected.

In response to rotation of wheels 401 and 402 relative to carrier 451, such as in response to a driving of vehicle 406 in the normal manner causing wheels 401 and 402 to rotate relative to the road or other surface over which the vehicle is driven, magnets 460 carried by wheels 401 and 402 rotate relative to carrier 451 and coils 461 whereby the magnetic energy imparted by magnets 460 on either side of carrier 451 energizes coils 461 with electromagnetic energy. The electromagnetic energy generated in coils 461 conducts to, or is otherwise imparted to, electrical wiring 462 electrically connected between coils 461 and a power converter (not shown) mounted onboard vehicle 406. The electromagnetic energy imparted to coils 461 is received by electrical wiring 462 and is conducted to the power converter, which converts the incoming electromagnetic energy into direct current electrical power that may be put to use for any desired or selected purpose, such as to providing recharging energy to a battery power source for, in turn, providing useful energy to selected equipment onboard the vehicle, and/or for providing power directly to selected equipment onboard the vehicle. According to the principle of the invention, electrical power generator 450 associated between carrier 451 and wheels 401 and 402 utilizes the rotation of wheels 401 and 402 relative to carrier 451 to generate electrical power. Because coils 461 interact with two opposed arrays of magnets 460, namely, the array of magnets 460 carried by wheel 401 on one side of carrier 451 and the array of magnets carried by wheel 402 on the opposed side of carrier 451, the electromagnetic energy generated and imparted into coils 461 is increased. Although magnets 460 are carried by wheels 401 and 402 and coils 461 are carried by carrier 451, this can be reversed, if desired. If desired, one of or each of wheels 401 and 402 may be fashioned with a spinner incorporating an electrical power generated as discussed in connection with the spinners set forth above and discussed in conjunction with wheel assembly 20 and wheel assembly 220. Electrical wiring 462 extends through damper 454 from carrier 451 to vehicle frame 462.

Figure 12:
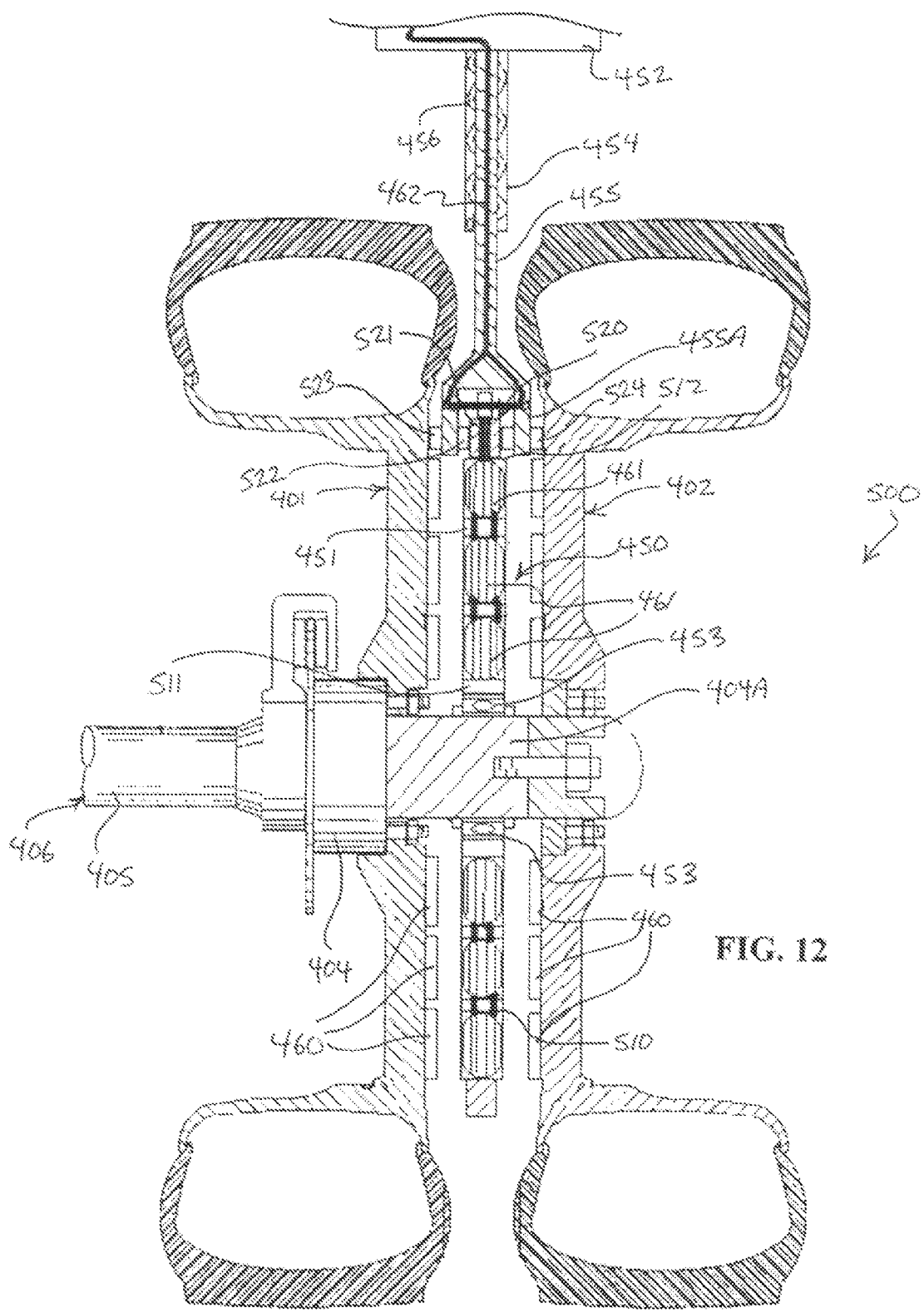
FIG. 12 is a vertical sectional view of yet still another alternate embodiment of a wheel assembly incorporating an electric power generated constructed and arranged in accordance with the principle of the invention.

As a matter of example of yet another alternative form of vehicle wheel incorporating an electrical power generator, in FIG. 12 there is seen a dually wheel or assembly 500 constructed and arranged in accordance with the principle of the invention. In common with the wheel assembly denoted at 400 discussed in connection with FIG. 11, wheel assembly 500 shares opposed wheels 401 and 402, axle 405 of vehicle 406, rotor 404, and electric power generator 450 including carrier 451, damper 454 including arm 455 partially received in corresponding cylinder 456 affixed to vehicle frame 452 such that arm 455 reciprocates relative to cylinder 456 in response to movement of vehicle frame 452 relative to axle 405 and extension 404A and carrier 451, roller bearings 453 coupled between carrier 451 and extension 404A permitting extension 404A and carrier 451 to rotate relative to one another, array of magnets 460 carried by the outer side of wheel 401, array of magnets 460 is carried by the inner side of wheel 402, corresponding array of coils 461 is carried by carrier 451, and electrical wiring 462.

In the present embodiment denoted at 500, carrier 451 consists of a generally circular frame 510 having a hub 511 mounted to roller bearings 453 and an opposed, circular perimeter edge 512. A roller bearing 520 is coupled between carrier 451 and arm 455, and between carrier 451 and wheels 401 and 402 whereby rotation of wheels 401 and 402 in one direction imparts rotation to carrier 451 in the opposed direction rotating coils 461 in the opposite direction to that of magnets 460 increasing the generation of electromagnetic energy in coils 461, in accordance with the principle of the invention.

Roller bearing 520 is carried by a free end 455A of arm 455, and includes a central wheel 521 engaging perimeter edge 512 of carrier 451 and which is affixed to a cylindrical shaft 522 mounted for rotation to free end 455A of arm 455, and which has an end 523 that interacts with wheel 401 and an opposed end 524 that interacts with wheel 402. Roller bearing 520 is a conventional electrical roller bearing electrically connected to electrical wiring 462 utilizing conventional electrical wiring techniques. Damper 454 is coupled between roller bearing 520 and carrier 451 permitting carrier 451 to displace relative to vehicle frame 452.

The interaction of ends 523 and 524 of shaft 522 with wheels 401 and 402 causes shaft 522 to rotate in response to rotation of wheels 401 and 402, in which the interaction of ends 523 and 524 with wheels 401 and 402 causes shaft 522 to rotate in the same rotational direction as the rotational direction of wheels 401 and 402. Rotation of shaft 522, in turn, rotates wheel 521 affixed to shaft 522 in the same rotational direction as shaft 522 and wheels 401 and 402, whereby the engagement of wheel 521 to perimeter edge 512 of carrier 451 imparts rotation to carrier 451 in a rotational direction opposite to the rotational direction of wheels 401 and 402, which thereby causes magnets 460 and coils 461 to rotate in opposing rotational directions increasing the generation of electromagnetic energy in coils 461 that conducts to electrical wiring 462 via roller bearing 520.

In wheel assembly 500, carrier 451 is operative coupled to wheels 401 and 402, whereby rotation of wheels 401 and 402 in a first rotational direction imparts rotation to carrier 451 in a second rotational direction opposite to the first rotational direction. Although carrier 451 is operatively coupled to wheels 401 and 402, carrier 451 may be operatively coupled to only one of wheels 401 and 402, if desired. In the present embodiment, roller bearing 520 operatively couples carrier 451 to wheels 401 and 402 and herein specifically disclosed. Although in FIG. 12 roller bearing 520 associated with carrier 451 interacts with two wheels, roller bearing 520 and carrier 451 may be utilized on connection with just one wheel, if desired. Furthermore, any suitable form of roller bearing may be used in conjunction with wheel assembly 500 for operatively coupling carrier 451 to one or each of wheels 401 and 402 for imparting rotation to carrier 451 in the opposite direction to that of wheels 401 and 402 as may be desired. Like wheel assembly 400, in wheel assembly 500 although magnets 460 are carried by wheels 401 and 402 and coils 461 are carried by carrier 451, this can be reversed, if desired.

Figure 13:
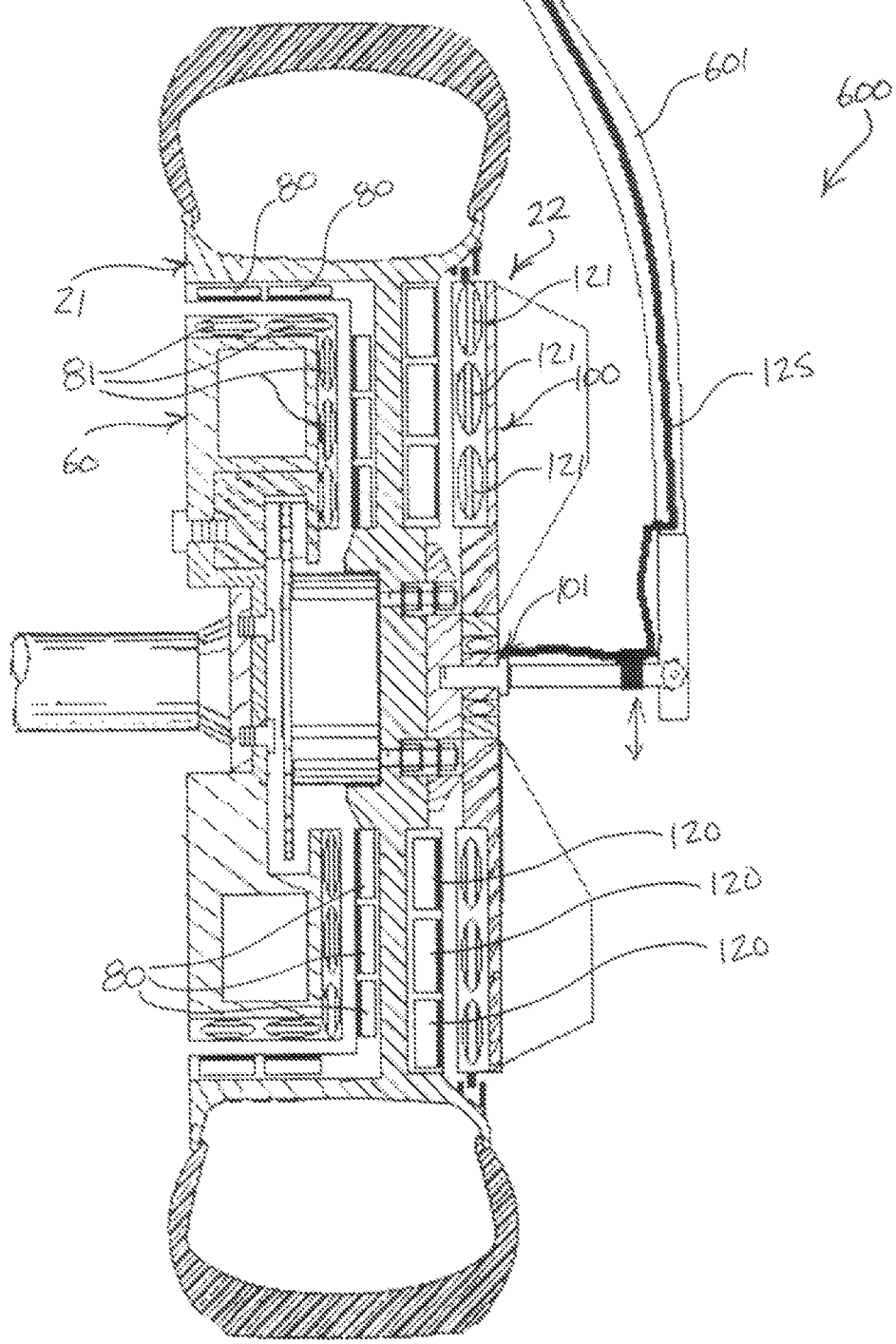
FIG. 13 is a vertical sectional view of still another alternate embodiment of a wheel assembly incorporating an electric power generated constructed and arranged in accordance with the principle of the invention.

Reference is now made to FIG. 13, in which there is seen yet still a further embodiment of a wheel assembly constructed and arrange in accordance with the principle of the invention and generally designed by the reference character 600. In common with wheel assembly 20 discussed in conjunction with FIGS. 1-7, wheel assembly 600 incorporated with vehicle 65 shares wheel 21 and electrical power generator 22 including carrier 60, magnets 80, coils 81, spinner 100, magnets 120, coils 121 and rotary electrical connector 101 including electrical wiring 125.

In the present embodiment, vehicle 65 incorporates a vehicle body 601, a portion of which is shown extending alongside and outboard of wheel assembly 600. Rather than extending inwardly as in wheel assembly 20, electrical wiring 125 extends outwardly from rotary connector 101 relative to spinner 100 and wheel assembly 20 to vehicle body 601, and extends along vehicle body 601 to the power converter (not shown). Electrical wiring 125 extending from rotary connector 101 is incorporated into or other secured to vehicle body 601 in the present embodiment. The instruction provided by wheel assembly 600 relates to how the electrical wiring from spinner 100 can extend outwardly to the vehicle body and then extend along the vehicle body to the power converter, rather than extending the electrical wiring inwardly relative to the wheel assembly as illustrated in connection with wheel assembly 20. It is to be understood that the arrangement of the electrical wiring electrically coupled between the spinner of the electrical power generator and the power converter as illustrated in connection with wheel assembly 600 may be utilized in connection with wheel assembly 220, if desired. Preferably, vehicle body 601 is arranged to direct air to spinner 100 as vehicle 65 is driven for maximizing the interaction of the aerofoils of spinner 100 with the air stream for imparting rotation to spinner 100 in the opposite rotational direction to that of the vehicle wheel.

The invention has been described above with reference to preferred embodiments. However, those skilled in the art will recognize that changes and modifications may be made to the embodiments without departing from the nature and scope of the invention. For instance, the various embodiments of an electrical power generator constructed and arranged in accordance with the invention may be utilized in connection with a wheel or wheel assembly mounted to rotate relative to an axle or with a wheel or wheel assembly affixed to an axle that is, in turn, mounted for rotation. Further, in the various embodiments magnets are carried by the wheels and the corresponding coils are carried by the carriers. This arrangement can be reversed, if desired, ensuring that the corresponding power converter is electrically coupled to receive the electromagnetic energy generated in the coils. Permanent or electromagnets may also be used in connection with the various embodiments, if so desired. Still further, although the coils are carried by the spinners and the corresponding magnets relating to the spinner coils are carried by the wheels in the various embodiments, this arrangement can be reversed, if desired, ensuring that the corresponding power converter is electrically coupled to receive the electromagnetic energy generated in the coils. Furthermore, any suitable means for electrically connecting the coils, and/or the carriers and/or the spinners to the power converters of the various embodiments of the invention can be accomplished in any suitable way according to the skill attributed to a skilled electrician. Still further, in any embodiment of the invention a damper may be utilized between the vehicle frame and the carrier or stator for coupling the carrier or stator to the vehicle frame and allowing the carrier or stator to displace relative to the vehicle frame.

Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A wheel assembly, comprising:
   a carrier;
   a wheel mounted adjacent to the carrier for rotation relative to the carrier, the wheel having a first side facing the carrier and an opposed second side;

a first array of magnets carried by one of the first side of the wheel and the carrier;

a first array of coils carried by the other of the first side of the wheel and the carrier corresponding to the first array of magnets, the first array of coils spaced from and aligned with the first array of magnets;

a spinner mounted adjacent to the second side of the wheel for rotation relative to the wheel;

a second array of magnets carried by one of the second face of the wheel and the carrier; and a second array of coils carried by the other of the second face of the wheel and the spinner corresponding to the second array of magnets, the second array of coils spaced from and aligned with the second array of magnets.

2. The wheel assembly according to claim 1, further comprising an aerofoil supported by the spinner adapted to interact with an air stream passing relative to the wheel in response to a rolling of the wheel relative to a surface in a first rotational direction for setting the spinner in rotational motion in a second rotational direction opposite to the first rotational direction.

3. The wheel assembly according to claim 2, wherein the aerofoil is mounted to the spinner for movement between a retracted position relative to the spinner and a deployed position relative to the spinner in response to application of the air stream to the aerofoil.

4. The wheel assembly according to claim 3, further comprising a winglet attached to the aerofoil for initially interacting with the air stream for initially drawing the aerofoil out of the retracted position toward the deployed position.

5. The wheel assembly according to claim 3, further comprising:

a compartment formed between the spinner and the wheel;

an opening through the spinner leading to the compartment;

the aerofoil mounted to the spinner proximate to the opening; and the aerofoil at least partially received in the compartment through the opening in the retracted position of the aerofoil.

6. The wheel assembly according to claim 3, further comprising a bias imparted to the aerofoil biasing the aerofoil into the retracted position.

7. The wheel assembly according to claim 6, further comprising a spring interacting between the spinner and the aerofoil imparting to the aerofoil the bias biasing the aerofoil into the retracted position.

8. The wheel assembly according to claim 6, further comprising the aerofoil formed of a resilient material imparting the bias to the aerofoil biasing the aerofoil into the retracted position.

9. The wheel assembly according to claim 1, further comprising:

first electrical wiring coupled to the first array of coils for receiving and carrying electromagnetic energy from the first array of coils; and second electrical wiring coupled to the second array of coils for receiving and carrying electromagnetic energy from the second array of coils.

10. The wheel assembly according to claim 1, further comprising:

the first array of magnets comprising:
circumferential arrays of magnets, and
annular arrays of magnets substantially perpendicular to the circumferential arrays of magnets; and the first array of coils comprising:
circumferential arrays of coils spaced from, opposing, substantially parallel to and corresponding with the circumferential arrays of magnets, and
annular arrays of coils spaced from, opposing, substantially parallel to and corresponding with the annular arrays of magnets.

11. The wheel assembly according to claim 1, further comprising:

the second array of magnets comprising:
circumferential arrays of magnets, and
annular arrays of magnets substantially perpendicular to the circumferential arrays of magnets; and the second array of coils comprising:
circumferential arrays of coils spaced from, opposing, substantially parallel to and corresponding with the circumferential arrays of magnets, and
annular arrays of coils spaced from, opposing, substantially parallel to and corresponding with the annular arrays of magnets.

\* \* \* \* \*